US012705720B2

(12) United States Patent
Chartier et al.

(10) Patent No.: US 12,705,720 B2
(45) Date of Patent: Aug. 11, 2026

(54) SELF-TRAINABLE NEURAL NETWORK APPLICATION FOR ANOMALY DETECTION OF BIOPHARMACEUTICAL PRODUCTS

(71) Applicant: Modicus Prime Ltd., La Porte, IN (US)

(72) Inventors: Taylor Chartier, La Porte, IN (US); Vitaliy Kucheryaviy, La Porte, IN (US); David Vardanyan, La Porte, IN (US)

(73) Assignee: Modicus Prime Ltd.

( * ) Notice: Subject to any disclaimer, the term of this patent is extended or adjusted under 35 U.S.C. 154(b) by 251 days.

(21) Appl. No.: 18/281,255

(22) PCT Filed: Mar. 9, 2022

(86) PCT No.: PCT/US2022/019599
§ 371 (c)(1),
(2) Date: Sep. 8, 2023

(87) PCT Pub. No.: WO2022/192432
PCT Pub. Date: Sep. 15, 2022

(65) Prior Publication Data

US 2024/0144460 A1 May 2, 2024

Related U.S. Application Data

(60) Provisional application No. 63/159,539, filed on Mar. 11, 2021.

(51) Int. Cl.
*G06T 7/00* (2017.01)
*G06V 10/82* (2022.01)

(52) U.S. Cl.
CPC ............ *G06T 7/0004* (2013.01); *G06V 10/82* (2022.01)

(58) Field of Classification Search
CPC ......... G06T 7/0004; G06T 2207/20081; G06T 2207/20084; G06V 10/82; G06V 20/698; G06N 3/0464; G06N 3/09; G06N 3/08
(Continued)

(56) References Cited

U.S. PATENT DOCUMENTS

| | | | |
|---|---|---|---|
| 2010/0057368 | A1 | 3/2010 | Afeyan et al. |
| 2017/0172527 | A1 | 6/2017 | Uber, III |
| 2021/0035288 | A1 | 2/2021 | Liu et al. |

OTHER PUBLICATIONS

International Search Report and Written Opinion of PCT/US22/19599 mailed on Jul. 20, 2022 (13 pages).

*Primary Examiner* — Charlotte M Baker
(74) *Attorney, Agent, or Firm* — DLA PIPER LLP (US); Blake W. Jackson

(57) ABSTRACT

System for analyzing anomalies in pharmaceuticals includes a server configured to host a neural network having an inference engine and a training engine, a database of images of in-process biologics; a first user interface module for displaying to a user particle morphologies in the images; a second user interface module for displaying to the user a training of the neural network; a third user interface module for displaying to the user an inference of images chosen by the neural network to fit selected criteria, wherein the neural network is a convolutional neural network, and training includes providing test images to the training engine to teach the neural network to recognize specific particle morphologies. The user provides images of the in-process biologics from the database, and the inference engine identifies anomalous particle morphologies in the user-provided images. A fourth user interface module provides a report about particle morphologies in the images.

20 Claims, 19 Drawing Sheets

100

(58) Field of Classification Search
USPC .......................................................... 382/128
See application file for complete search history.

100

200

300

500

600

700

806

800

900

1000

1100

1200

1300 mpVision Type to search Inference: online Training: online david

Dashboard Inference Training Reports

24/05/2017, 10:30 24/05/2017, 10:30

| | Session ID | Date | Project Name | Batch Name | Analysis Method | Duration | Action |
|---|---|---|---|---|---|---|---|
| ˅ | 314 | February 12th 2021, 3:39:41 pm | boop | | | N/A | View Session |
| ˅ | 312 | February 12th 2021, 3:20:34 pm | | | | N/A | View Session |
| ˄ | 311 | February 11th 2021, 8:57:03 pm | | | | N/A | View Session |

| Particle ID | Frame ID | ECD (px) | ECD (um) | Area (px) | Perimeter | Circularity | Max Feret Diameter (px) | Max Feret Diameter (µm) | Aspect Ratio | X Left | X Right | Y Top | Y Bottom | Classification Result | Score |
|---|---|---|---|---|---|---|---|---|---|---|---|---|---|---|---|
| 3453319 | 8697 | 4.983 | 0.712 | 19.5 | 20.243 | 0.598 | 6 | 0.857 | 1.5 | 16 | 11 | 7 | 0 | particle | 0.998 |
| 3453318 | 8697 | 7.611 | 1.087 | 45.5 | 46.385 | 0.266 | 12.182 | 1.74 | 1.444 | 425 | 412 | 10 | 0 | translucent | 0.998 |
| 3453317 | 8697 | 3.827 | 0.547 | 11.5 | 20.243 | 0.353 | 6 | 0.857 | 2 | 878 | 871 | 4 | 0 | translucent | 0.998 |
| 3453316 | 8697 | 6.18 | 0.883 | 30 | 24.485 | 0.629 | 8 | 1.143 | 1.333 | 897 | 898 | 7 | 0 | translucent | |

1400

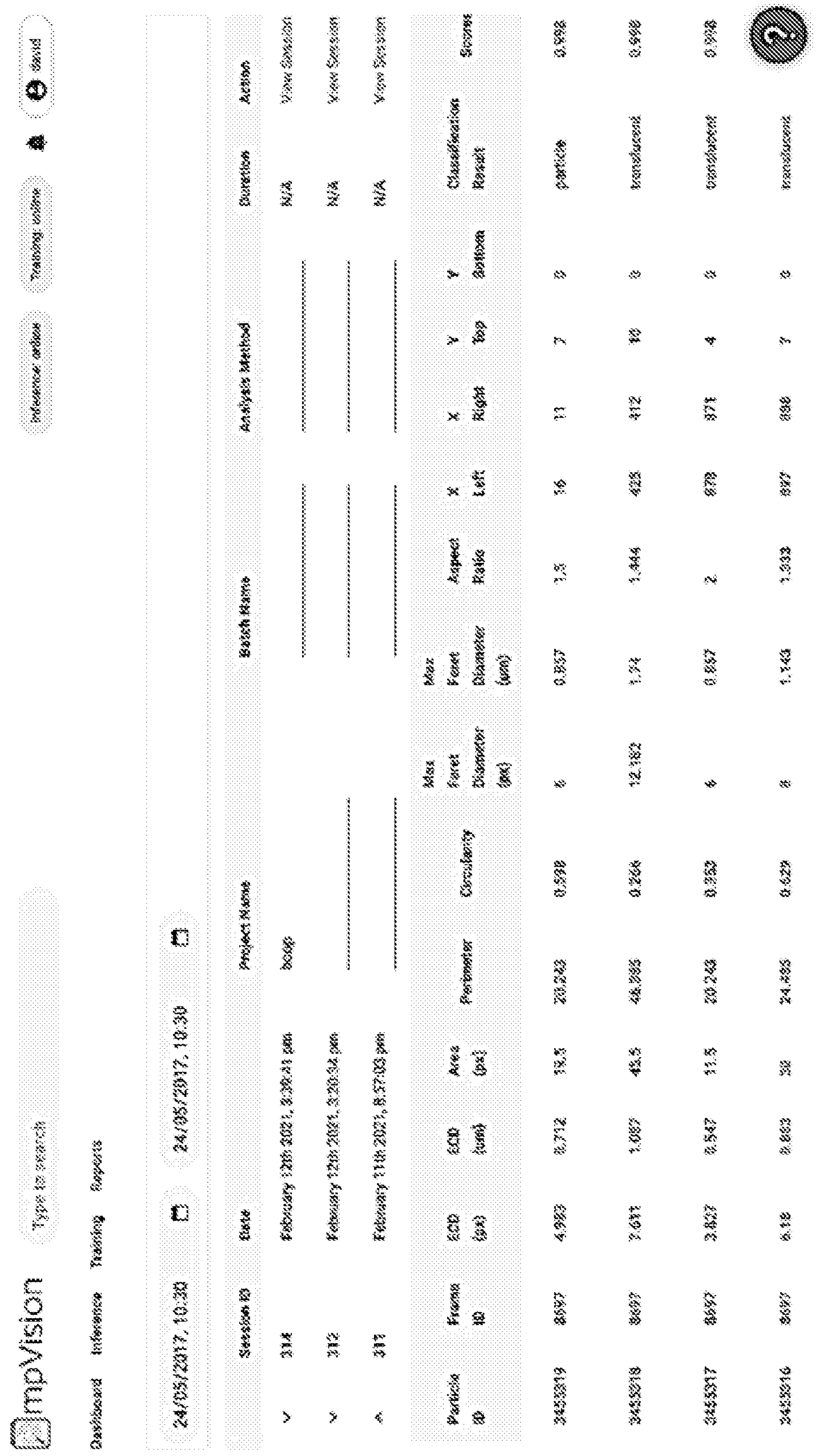

SELF-TRAINABLE NEURAL NETWORK APPLICATION FOR ANOMALY DETECTION OF BIOPHARMACEUTICAL PRODUCTS

CROSS REFERENCE

This application is a 35 USC § 371 National Stage application of International Application No. PCT/US2022/019599 filed Mar. 9, 2022 and entitled "Self-Trainable Neural Network Application for Anomaly Detection of Biopharmaceutical Products", now pending; which claims the benefit under 35 USC § 119(e) to U.S. Provisional Patent Application Ser. No. 63/159,539 filed Mar. 11, 2021 and entitled "Self-Trainable Neural Network Application for Anomaly Detection of Biopharmaceutical Products". The disclosure of each of the prior applications is considered part of and is incorporated by reference in the disclosure of this application.

FIELD

The disclosure relates to real-time identification of particulate-related anomalies in pharmaceutical products, using a neural network algorithm.

BACKGROUND

One of the problems in pharmaceutical development and manufacturing is insufficient real-time characterization and anomaly detection of drug substance particulates within images generated by process development, medical devices, and manufacturing unit operations. Sufficient product understanding and subsequent process control is compromised without continuous identification of particulates based on morphology and statistical quantification. Current software systems do not provide accurate particle-by-particle detection methods, which leaves knowledge gaps in drug substance characterization and poses compliance risks.

Particle detection accuracy is desired for achieving accurate particle characterization outputs. With conventional art, the translucent nature of many of these biologic particles is a challenge for current imaging software, causing parts of particles to be ignored or considered image 'background', which results in mischaracterization of particles. In severe cases, the drug substance particles are completely overlooked, because conventional particle analysis software generally miscounts particles. Also, given a lack of detection accuracy, current biologic particle characterization solutions do not assign identities with respective morphologies to these particles. In other words, conventional detection algorithms do not account for asymmetry and multi-coloration of unique biologic samples.

Pharmaceutical companies acknowledge this problem and subsequently outsource its biologics data—including images and various metadata—to third parties, however, this usually requires on average a two to four-week turnaround. This lack of real-time data optimization disables real-time prevention strategies, ultimately leading to potentially compromised product and cost inefficiencies. Indeed, batch-processing costs the pharmaceutical manufacturing industry about $50 billion each year due to inefficiencies, losses, contamination and expenses that come along with product recalls.

In addition, a fraction of the exported process data to third parties is utilized, as a mere 1-2% of the imaging data is currently utilized for data insight extraction. This small subset of exported data is due to cost restrictions for data exchange with these third parties, which prohibits holistic data optimization. Full data optimization is thus inhibited by this data exporting paradigm.

Therefore, there is a need in the art for a system and method that provides a more robust identification in real time of particulate-based anomalies in pharmaceutical products.

SUMMARY

This disclosure relates to identification in real time of particulate-based anomalies in pharmaceutical products, that attempts to overcome one or more disadvantages of the related art, and may provide other solutions as well.

In an exemplary embodiment, a system and/or computer program product on a tangible media, for analyzing anomalies in pharmaceuticals includes a server configured to host a neural network having an inference engine and a training engine, a database of images of in-process biologics; a first user interface module for displaying to a user particle morphologies in the images; a second user interface module for displaying to the user a training of the neural network; a third user interface module for displaying to the user an inference of images chosen by the neural network to fit selected criteria, wherein the neural network is a convolutional neural network, and the training includes providing test images to the training engine to teach the neural network to recognize specific particle morphologies; and wherein the user provides images of the in-process biologics from the database, and the inference engine identifies anomalous particle morphologies in the user-provided images; and a fourth user interface module for providing a report to the user about the particle morphologies in the images.

Optionally, the system includes a fifth user interface module for manually identifying and labeling specific particle morphologies in the test images. It will be appreciated by one of ordinary skill in the art that the division of the functionality into software modules, that are executed on the processor, is up to the software designer, and is not a critical aspect, since the different modules can be combined into more or fewer modules.

In another aspect, a method for analyzing anomalies in pharmaceuticals includes the steps of configuring a server to host a neural network having an inference engine and a training engine, a database of images of in-process biologics; using the training engine to train the neural network on test images showing particle morphologies, wherein the training includes providing the test images to the training engine to teach the neural network to recognize specific particle morphologies; using the inference engine on images provided to the neural network from the database to identify particle morphologies that fit selected criteria; wherein the neural network is a convolutional neural network; wherein the inference engine identifies anomalous particle morphologies in the user-provided images; and displaying to the user the particle morphologies in the images; and providing a report to the user about the particle morphologies in the images.

Additional features and advantages of this disclosure will be set forth in the description that follows, and in part will be apparent from the description, or may be learned by practice of the embodiments. The advantages of the disclosure will be realized and attained by the structure particularly pointed out in the written description and claims hereof as well as the appended drawings.

It is to be understood that both the foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of this disclosure and are incorporated in and constitute a part of this specification, illustrate example embodiments and together with the description serve to explain the principles of this disclosure.

In the drawings:

FIG. 14 shows an example of a report page with a table available for download with particle statistics, image coordinates, and AI outputs.

DESCRIPTION

Figure 1:
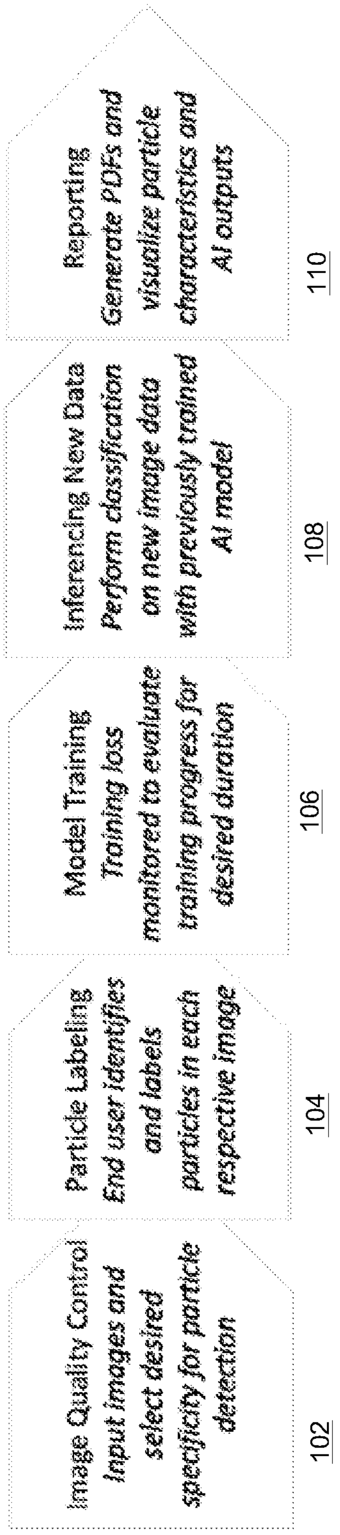
FIG. 1 shows an example of an initial processing workflow.

Reference will now be made in detail to the example embodiments, as illustrated in the accompanying drawings.

i. Example Overview

The present disclosure, in some embodiments, offers a self-service particle classification tool based on AI/Computer Vision to enable comprehensive biologics understanding and subsequent process control. The tool may include a computer application (which may implement one or more example embodiments disclosed herein) that augments biotech end users' domain expertise with AI capabilities to characterize and detect anomalies of drug substance particulates within images. Anomalies in this biologics context may refer to i) detected deviations in anticipated particle morphologies (e.g., heat stress of the proteins, shear stress of the proteins), ii) foreign particulates (e.g., glass, rubber, plastics), both identifiable and non-identifiable, etc. The computer application may be hardware-agnostic, meaning it can source images from any camera or system and process them accordingly. In addition, the computer application may have a different applications across the pharmaceutical value chain, from laboratories to manufacturing floors. The computer application may meet unmet needs of biologic particle classification, including AI accessibility, model generalization, data optimisation, and real-time functionality.

The computer application provides an AI self-service to end users by enabling them to train neural networks on their own drug substances to identify, classify, and subsequently characterize them, offering advanced AI multi-functionality beyond the analytical restrictions of traditional particle analysis software. Example features include the following: an early detection feature to warn end-users of a potentially compromised product, including particle anomaly classification and characterization; a leading-edge AI algorithm training module for the end-users to train the classification algorithm on image samples they curate and label themselves, thus creating a company-wide 'library of biologic particle AI models'; a pre-processing particle detection algorithm that may be adjusted to achieve the desired sensitivity and specificity in each image, real-time processing so end-users can perform biologic image analysis in-house, and report and graphics generation.

The following are some example functionalities of the computer application:

A. Particle Detection and Image Quality Control

An Image Quality Control panel may allow end users to define or edit attributes of both detected and self-labelled particles. Before both training and applying a neural network, end users are provided with a suite of image preprocessing and filtering options, including the selection of desired range of biologic particle pixel intensity, size, circularity, area, perimeter, circularity, equivalent circular diameter (ECD), and aspect ratio attributes. End users also select the sensitivity of a particle detection algorithm with upper and lower threshold values based upon the particular use case, e.g., Design-of-Experiments (DOE's), medical device performance comparison, and biologic commercial processes. The computer application's gradient-based particle detection algorithm may provide higher image quality control and accuracy than traditional particle analysis software and is described in H. Inference section below.

B. Image Labeler

An Image Labeler customizes particle labelling for AI training to enable the self-identification and self-labelling of particles in each image. End users build their own labelled data sets for the AI models to use for learning and subsequent application to new images. Training data is generated for new particle identities with this Image Labeler Interface.

C. AI Processing

Automated processing pipelines are provided for AI Training and AI Inference. The AI Training interface provides real-time update on the neural network's learning trajectory, including loss values and images with particle classification predictions. The additional options include specifying the learning rates, training method, and scheduler. AI Inference classifies particles on unseen data, giving the end user the option to choose from the library of their self-trained models.

D. Analytics Reporting and Visualisation

Figure 16:
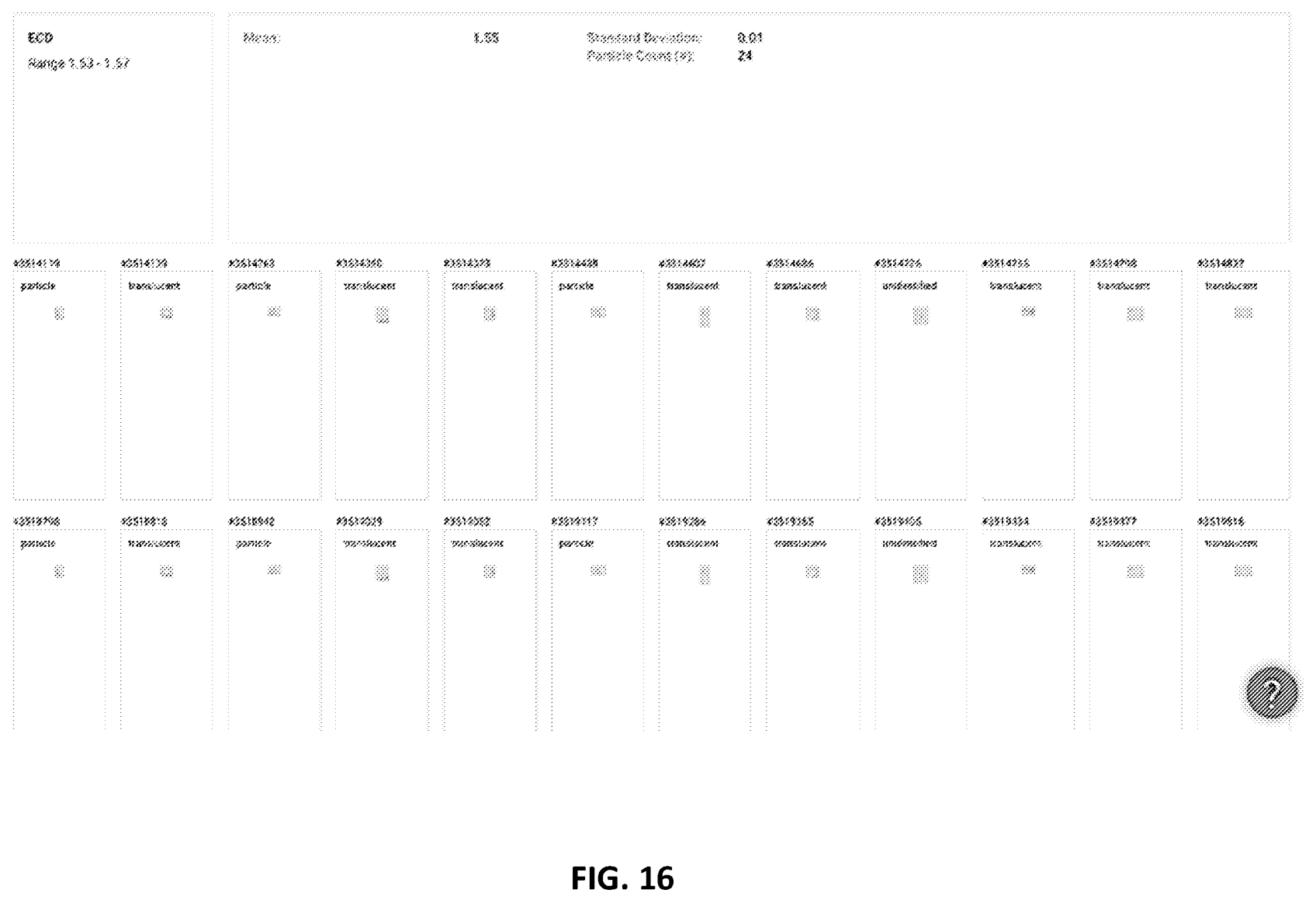
FIG. 16 shows examples of particle sub-images with corresponding AI classifications that are cropped from each submitted frame.

The particle statistics and classification results are compiled in the Reporting interface. Customizable, client-driven visualizations are provided for desired data insights, such as comparisons between Microfluid Imagings (MFIs), medical devices, or sites for scale down analysis. The computer application offers its end users include i) displaying individually classified particles with corresponding cropped sub-images, as illustrated in FIG. 16, ii) the graphics correlating biologic particle statistics to their corresponding identities, iii) the reporting of unknown or anomaly particles, etc.

E. Anomaly Detection

An anomaly alert system enables commercial manufacturing to achieve the ultimate objective of maintaining a state of process control. The hardware, including cameras and microfluid devices, e.g., MFI, are connected via an HTTP endpoint to the computer application for continuous real-time particle detection and evaluation. End users are alerted of any anomalies that are detected in biologic substances.

ii. User Interface Description and Usage

The computer application's user features may be divided into five example sections: Image Quality Control, Particle Labeling, Training, Inference, and Reporting.

FIG. 1 illustrates a process workflow 100 from initial image upload to final report generation, which is an example of initial processing workflow of an end user. Each stage may be performed consecutively during initial software usage.

After the initial workflow is completed, the end user may choose to proceed with the five processing stages independently, building new models and inferencing new data. For first-time users, however, it may be recommended to follow the five sections described in FIG. 1 consecutively.

A. Example Processing Stages of the Workflow 100 i. Image Quality Control 102

Figure 2:
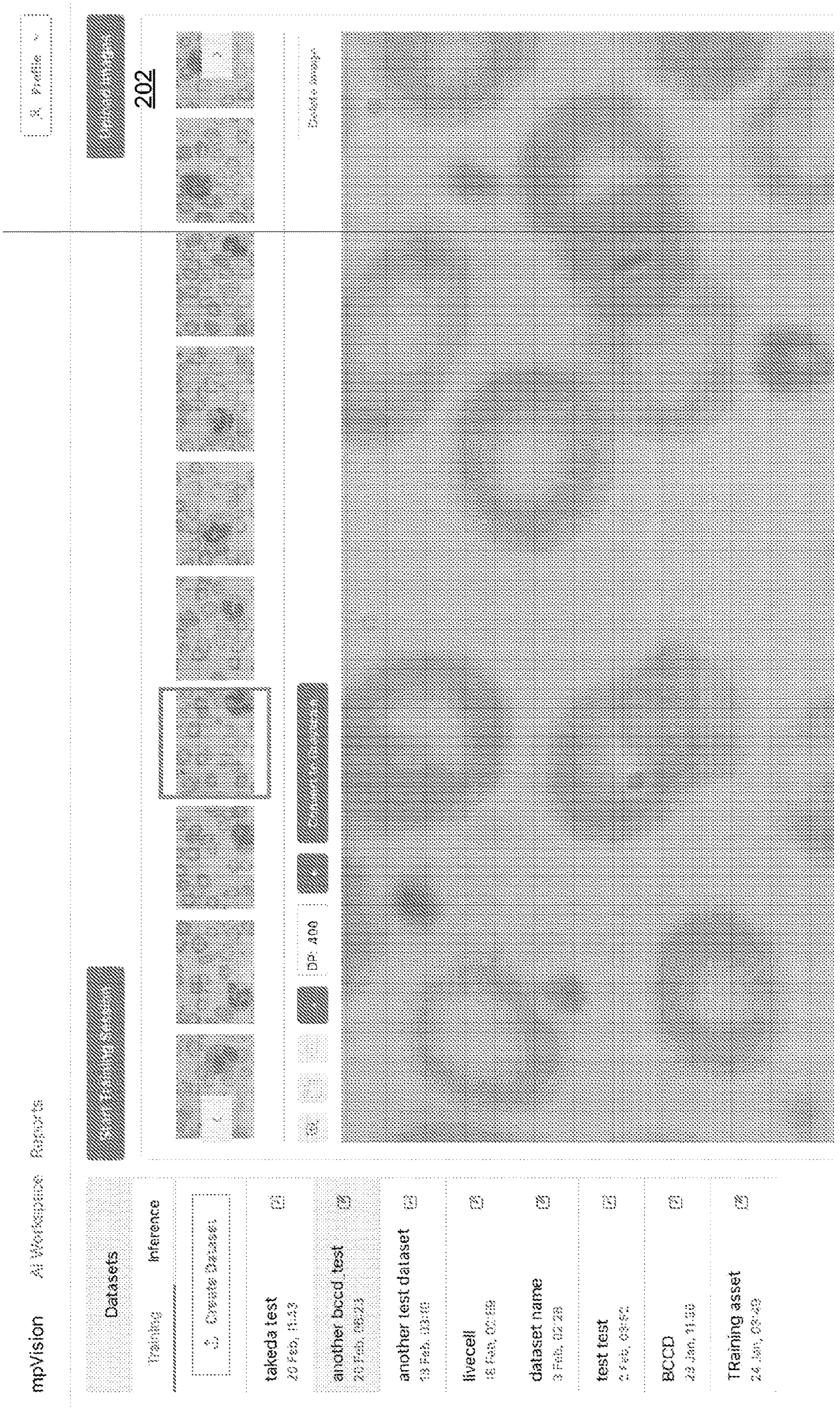
FIG. 2 shows an example of an image upload to quality control stage.

Images uploaded to the computer application are imported to the Image Quality Control stage 102. FIG. 2 shows an example interface 200 for first-time users to initially upload images/frames. Within the interface 200, an Upload Images button 202 may be used for accessing the functionality of uploading images or frames.

Figure 3:
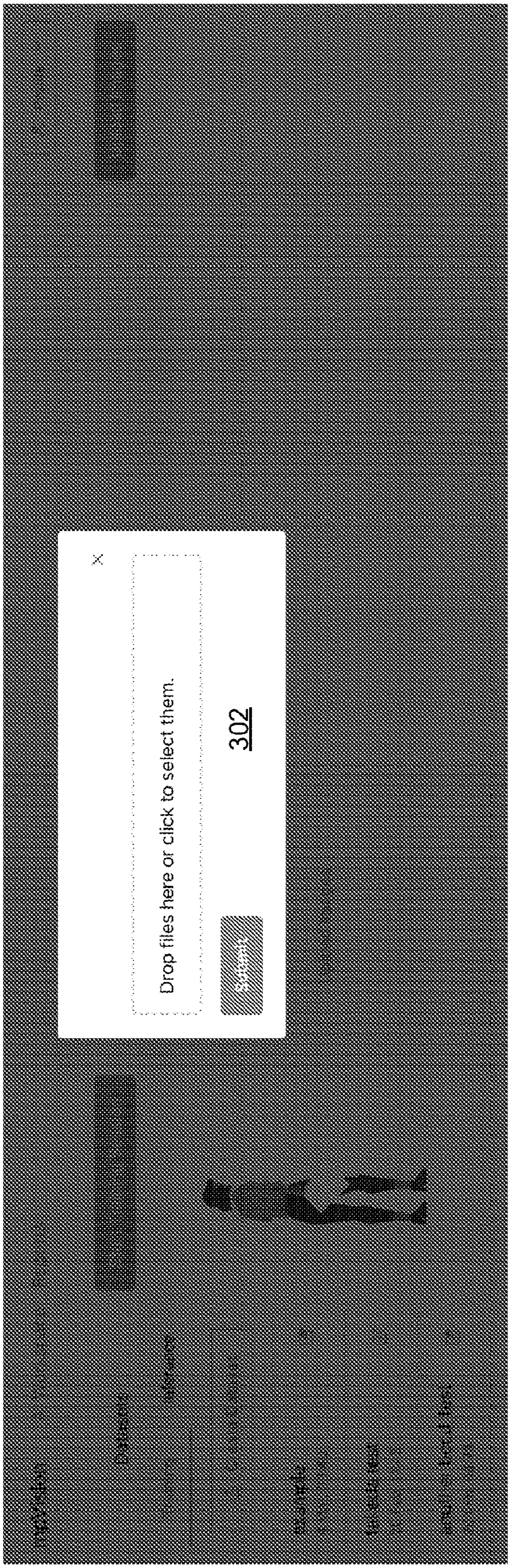
FIG. 3 shows an example of selecting images to be submitted to the application.

The frames uploaded in the Training Page will generate a data set for particle labelling. FIG. 3 shows an example interface 300 for selecting images to be submitted the computer application. As shown, the example interface 300 shows a drag and drop element 302 for selecting the images to be submitted to the computer application.

Figure 4:
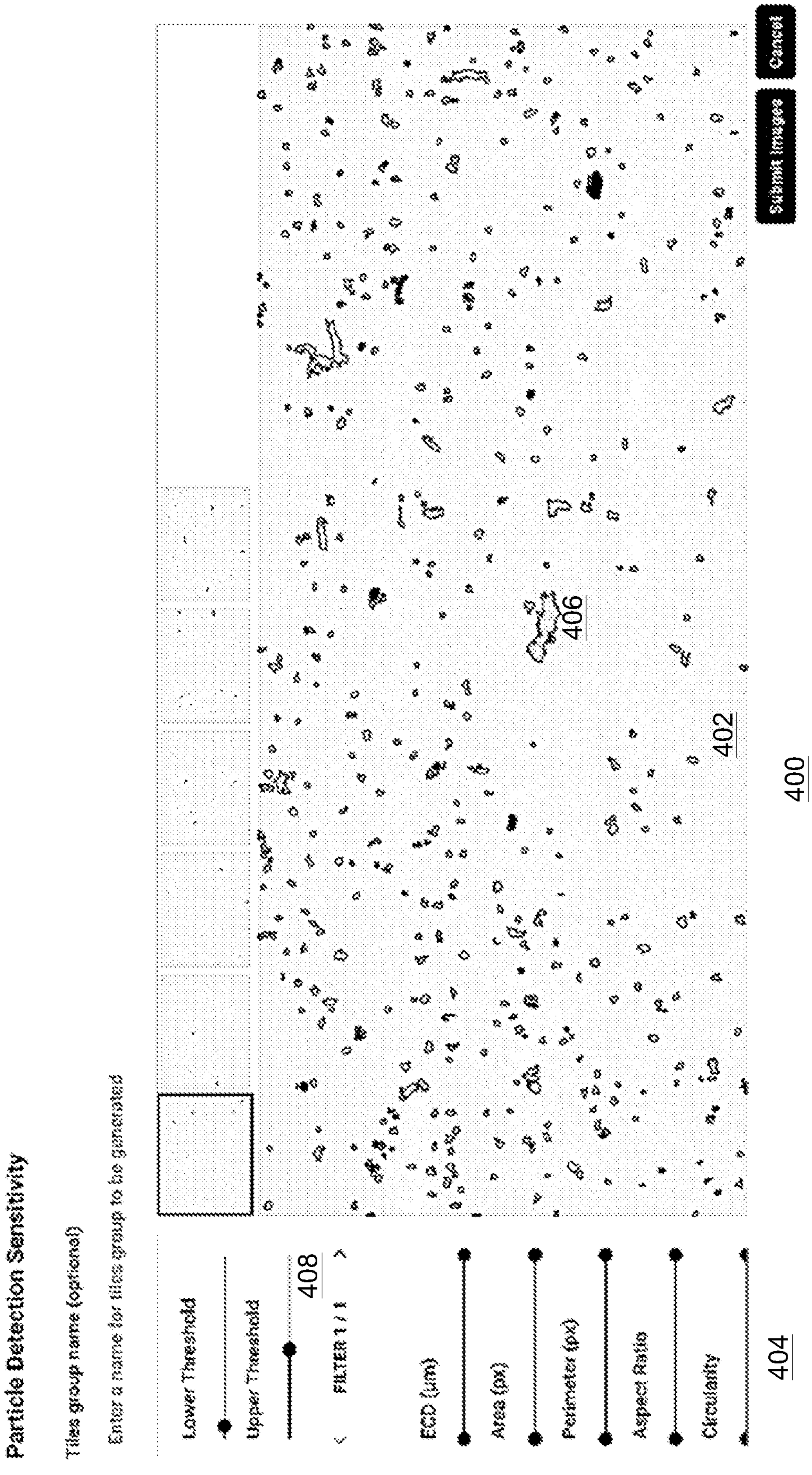
FIG. 4 shows an example of an Image Quality Control panel with the image displayed in an Image Viewer and corresponding Sensitivity Dials.

FIG. 4 shows an example interface 400 of an Image Quality Control panel. The example interface 400 includes an uploaded image 402 corresponding sensitivity dials 404. The image 402 displayed in the interface 400 comprises biologic particles with varying pixel intensities, sizes, circularity, and other morphological attributes. The neural network subsequently creates non-linear feature maps from these particle attributes, and these particle attributes are initially selected by the end users to filter desired particles in the Image Quality Control panel.

The particles detected are displayed as black outlines in FIG. 4 (an example outline has been labeled as 406). The sensitivity of the particle detection can be adjusted with the lower and upper threshold values 408. The recommended upper to lower ratio is between 2:1 and 3:1. When the desired sensitivity is achieved, a 'Tile group name' may be submitted to conveniently access the images for future use. Image filters, including particle characteristics such as ECD and particle intensity, may also be adjusted to select the desired ranges of particles. After the images are submitted, they are tiled accordingly.

Figure 5:
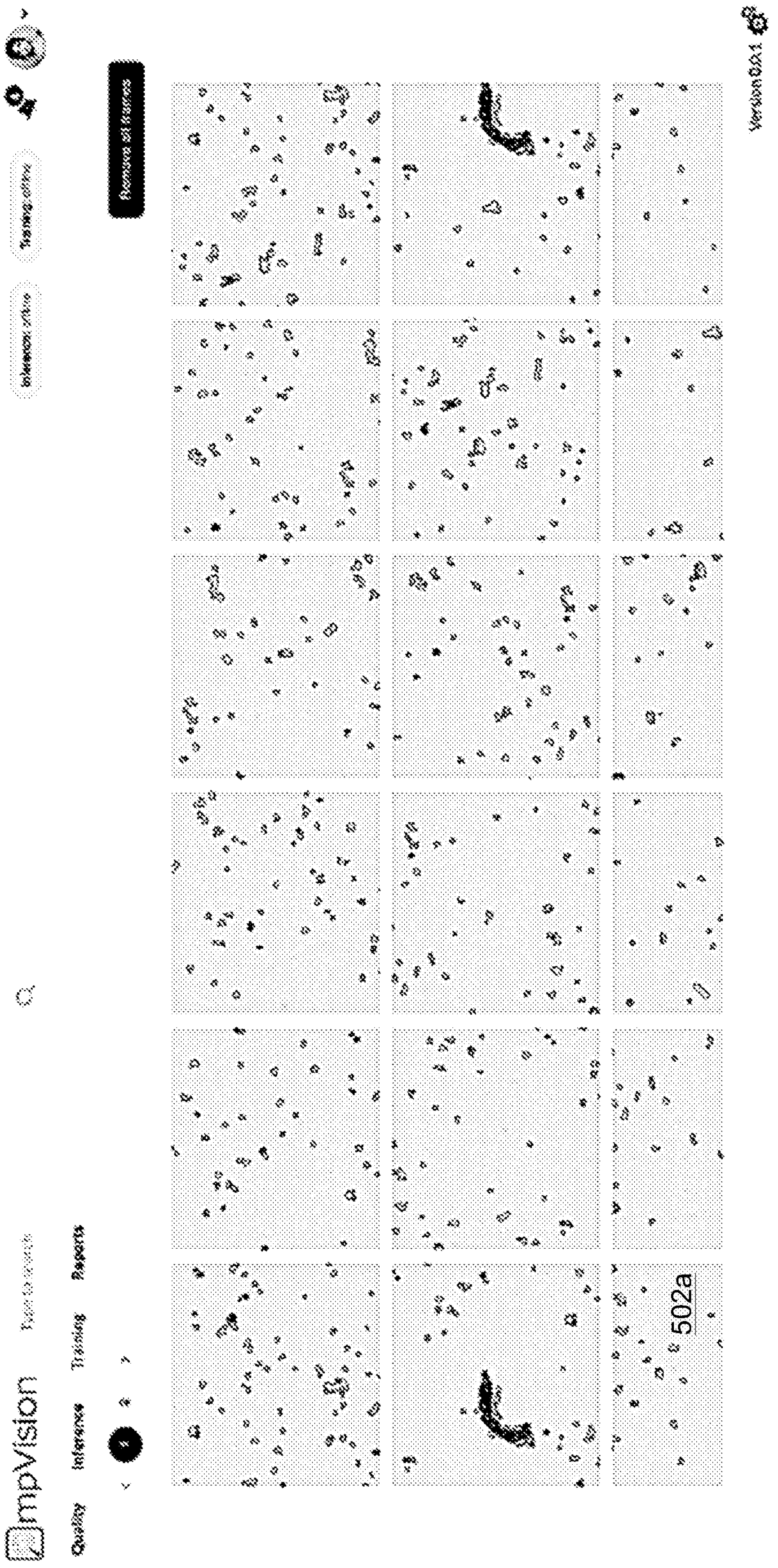
FIG. 5 shows an example of how the submitted images are tiled.

FIG. 5 shows an example interface 500 with image tiling. As shown in the interface 500, each input frame is tiled into sub-images for labeling (an example sub-image or tile is labeled as 502*a*). Each tile may be selected and labeled independently. The labels are saved with each tile.

ii. Image Labeling 104

Figure 6:
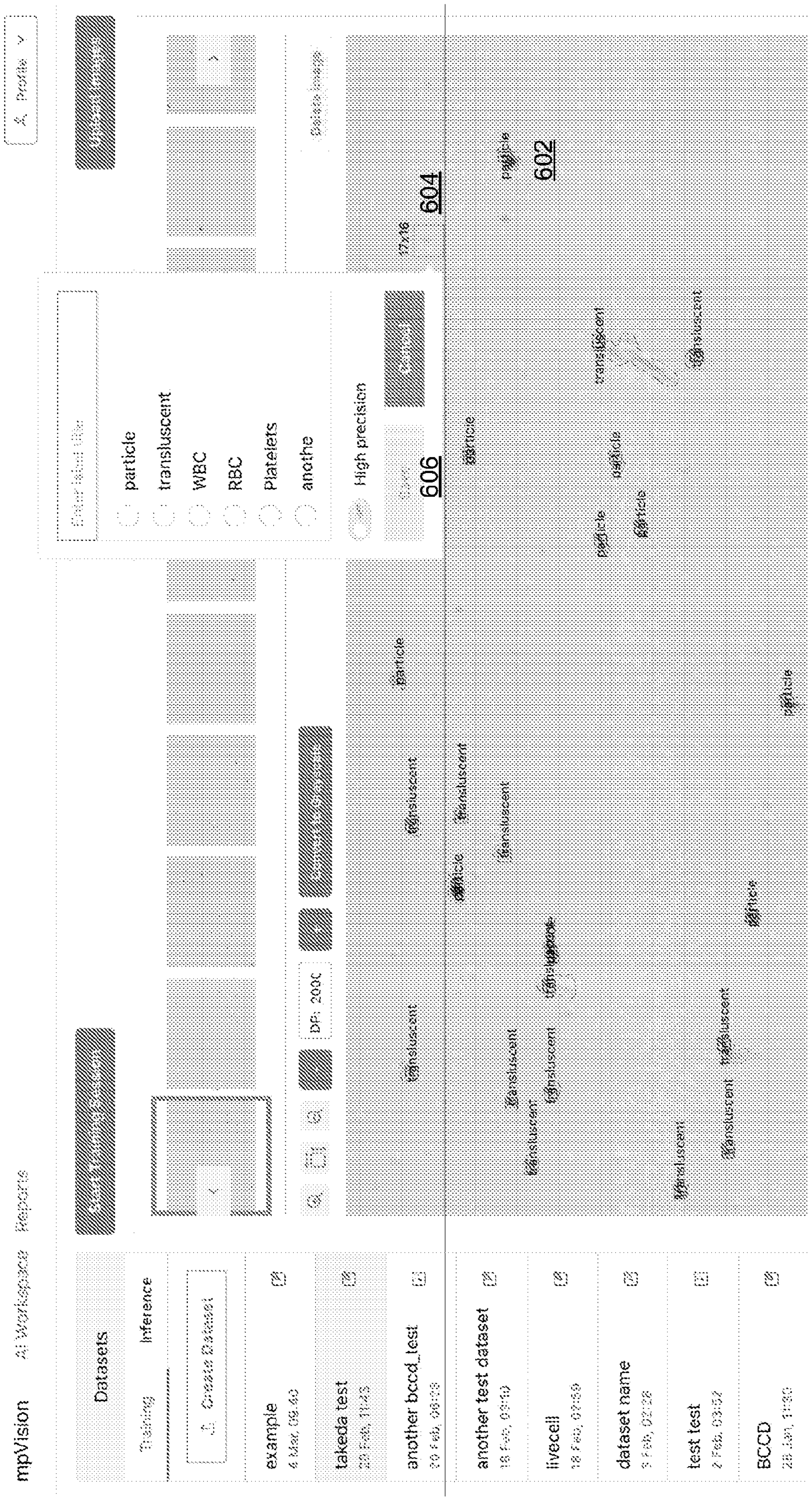
FIG. 6 shows an example of an Image Labeling panel.

Any tile generated from the original frame may be selected for labeling. FIG. 6 shows an example interface 600 of an Image Labeling panel. Particles will automatically be identified, an example identified particle is labeled as 602. Additionally, the end user can create a rectangular box around any particles not automatically detected by clicking and dragging a box around the particle, an example of such manual identification is labeled as 604. End user may input a label name (or choose from previously generated label names) and select Save. The most recent label is automatically applied to new particles—clicking on the automatically identified particles (e.g., 602) will apply recent label names automatically. Once the labeling is complete, clicking Save Labels (not shown) at the bottom of the interface 600 will record all X,Y coordinates and corresponding labels. Therefore, each particle may be labeled with a rectangular box and assigned a corresponding label.

iii. Model Training 106

Figure 7:
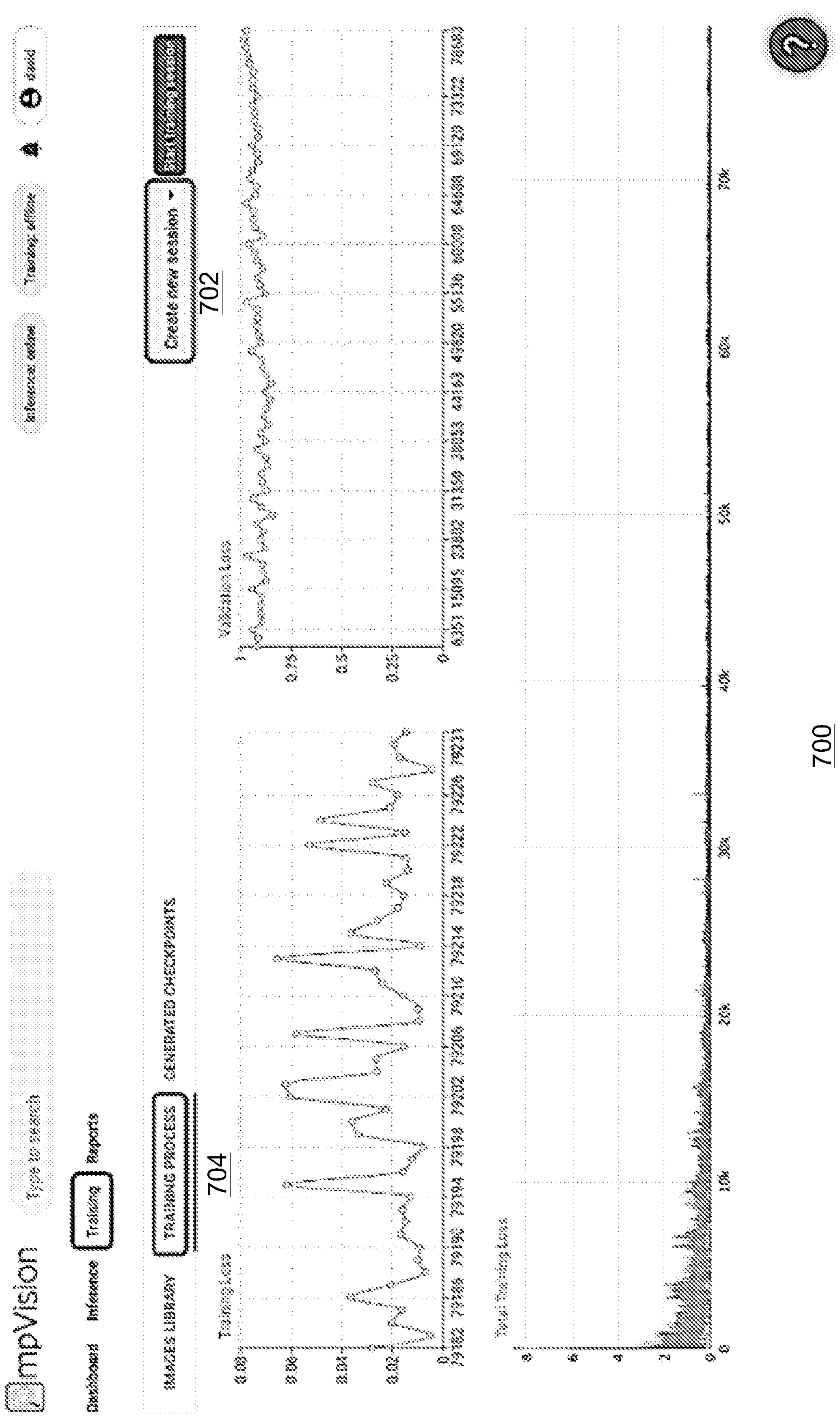
FIG. 7 shows an example of how model training progress may be visualized in the Training panel while the neural network is learning the particle labels.
Figure 8:
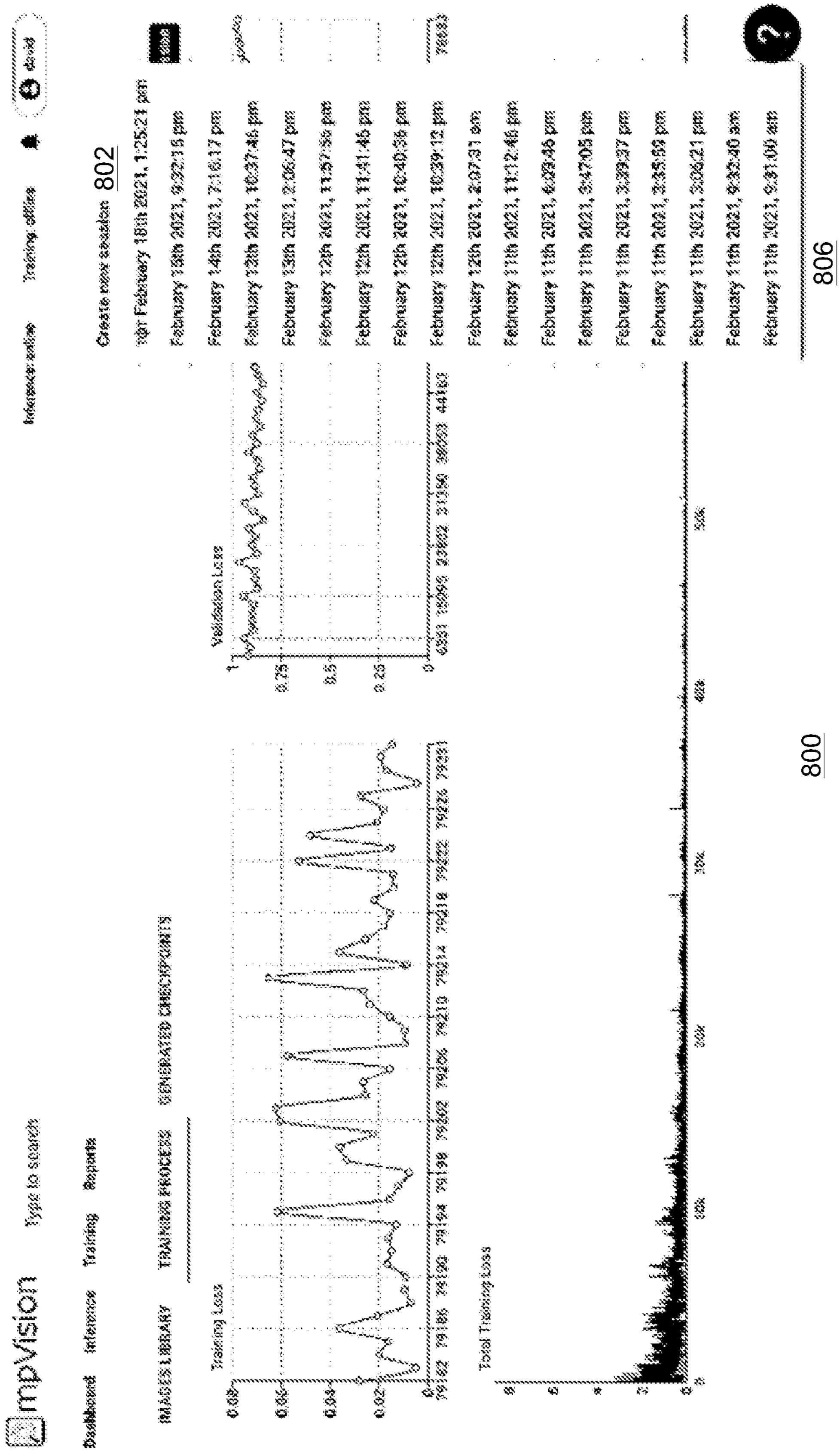
FIG. 8 shows an example display of one or more previous training sessions that may be selected for further model training.

Once the tiles have been labeled in the Image Labeler panel, the images may now be selected for training a model. FIG. 7 shows an example interface 700 for model training. If a new model is being trained on new data the following operations may performed on the example interface 700. 'Create new session' 702 may be selected under the TRAINING PROCESS tab 704 As shown in FIG. 7, the model training progress may be visualized in the Training panel while the neural network is learning the particle labels. If a previously trained model requires additional training, the same drop-down menu will display one or more previous training sessions that may be selected for further model training. FIG. 8 shows an example interface 800 for accessing previous trainings and providing additional training thereto. In particular, a dropdown menu 802 may show the previous training sessions 806. The previous trainings sessions 806 may have corresponding names and the corresponding dates. Thus, FIG. 8 shows continuing model training, where one or more previous training sessions 806 may be accessed for training continuation in the event that a model requires additional training. It may be recommended to select a minimum of 50-100 images for the training set.

Figure 9:
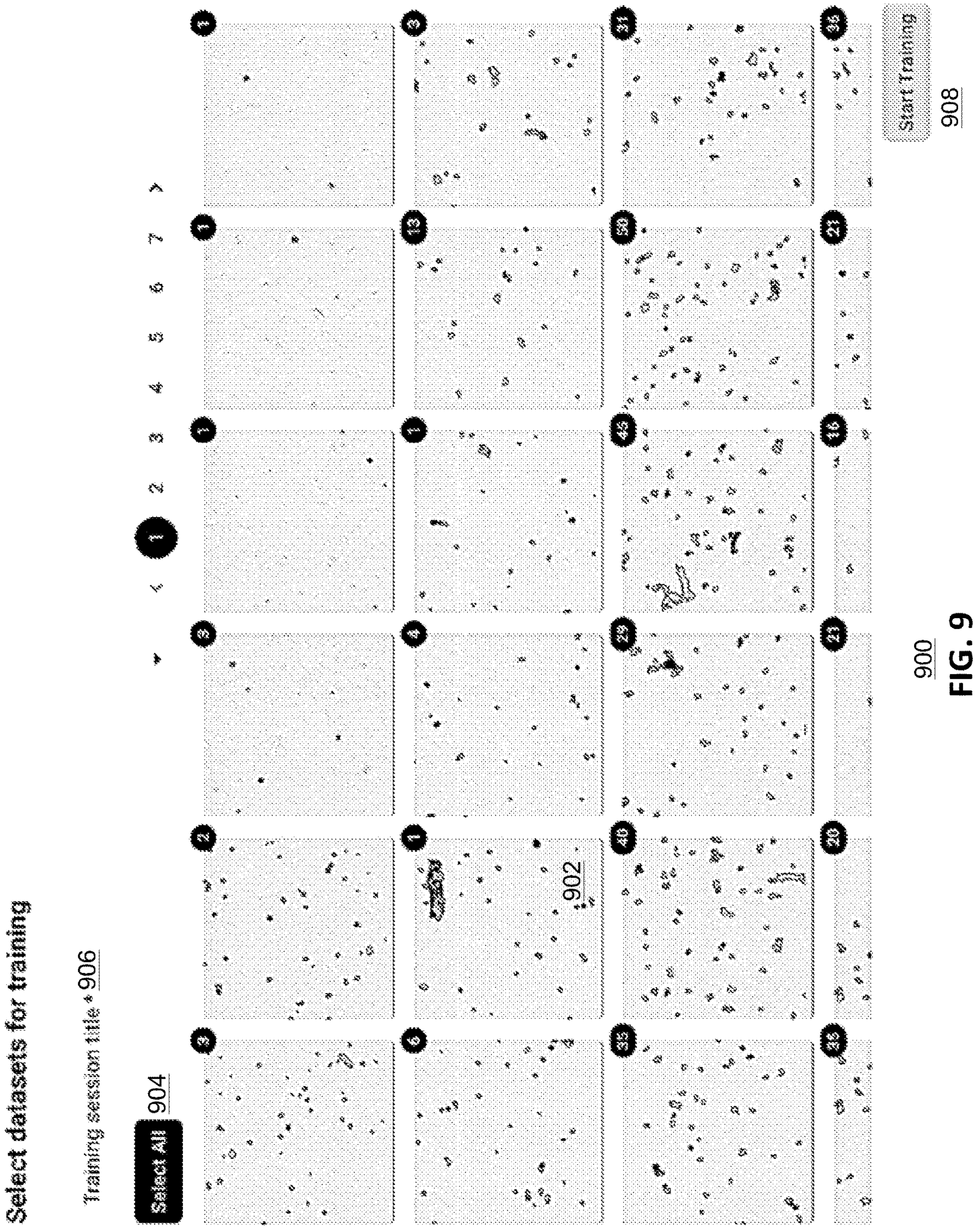
FIG. 9 shows an example selection of frames to be processed.

FIG. 9 shows an example interface 900 for training the model. Within the interface 900, the end user may select the labeled images (an example shown as 902) to train the model or choose 'Select All' button 904. A name may be provided for the training session in the naming box 'Training session title' 906. The name provided will be saved along with the start date to access the training session for any future model training (e.g., as shown in FIG. 8). The labeled images will comprise a training data set for the neural network. After the images are selected, the neural network will start training on the data set.

Figure 10:
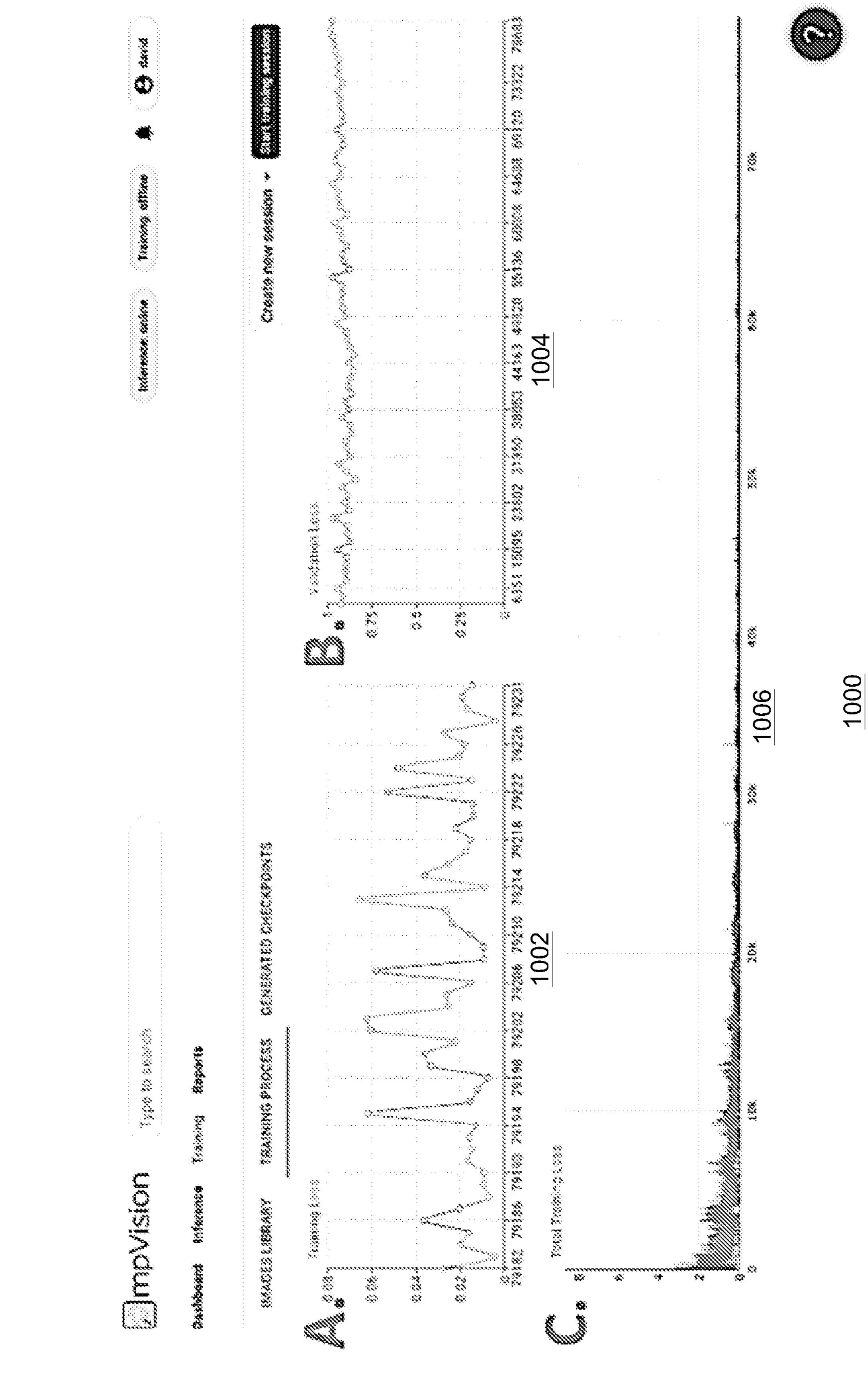
FIG. 10 shows an example of validation loss graphs.

Once the images have been selected, Start Training 908 may be selected. FIG. 10 shows an example interface 1000 generated during model training. As shown in the example interface 1000, after a training initialization period, data will begin populating the charts, including the training loss graph 1002, validation loss graph 1004, and total training loss graph 1006. When the training begins, the model performance is monitored to evaluate the training progress. The three charts on the Training Process page provide information on how well the model is learning the particle identities in the labeled images.

The loss is generated after each training step and is reported to monitor the training progress. While the model is training, it makes predictions on the identity of individual particles in each image. The model's prediction error is a combination of both localization and classification errors, and this is called the loss. Over time, the model continues to correct its misclassifications as it continues to learn from each labeled image. The model's loss therefore decreases and is monitored in the Training Loss Chart 1002 (A). The Total Training Loss Chart 1006 tracks the same AI loss values as the Training Loss Chart, but the loss is depicted on a larger scale for overall trend evaluation (C). The generalizability of the model is monitored with the same loss heuristic as the training, which is depicted in the Validation Loss 1004 (B).

During the course of the AI training, 20% of the labeled images are selected for model validation. These selected images comprise a separate validation data set. Validation exposes the neural network to these 'unseen' validation images on which it has not trained. This approach ensures the generalizability of the AI to future data. The validation loss is the error reported for 'held out' images randomly selected from the training data. To ensure a generalizable model, both the validation loss and the training loss may be monitored (as shown in Table 1 below).

TABLE 1

| Loss monitoring heuristics | |
|---|---|
| Training Loss >> Validation Loss and/or Training Loss is consistently decreasing | Underfitting |
| Validation Loss >> Training Loss and/or Validation Loss begins increasing | Overfitting |
| Validation Loss~Training Loss and/or both have reached consistent minimum after loss decrease | Generalizable Model |

Figure 11:
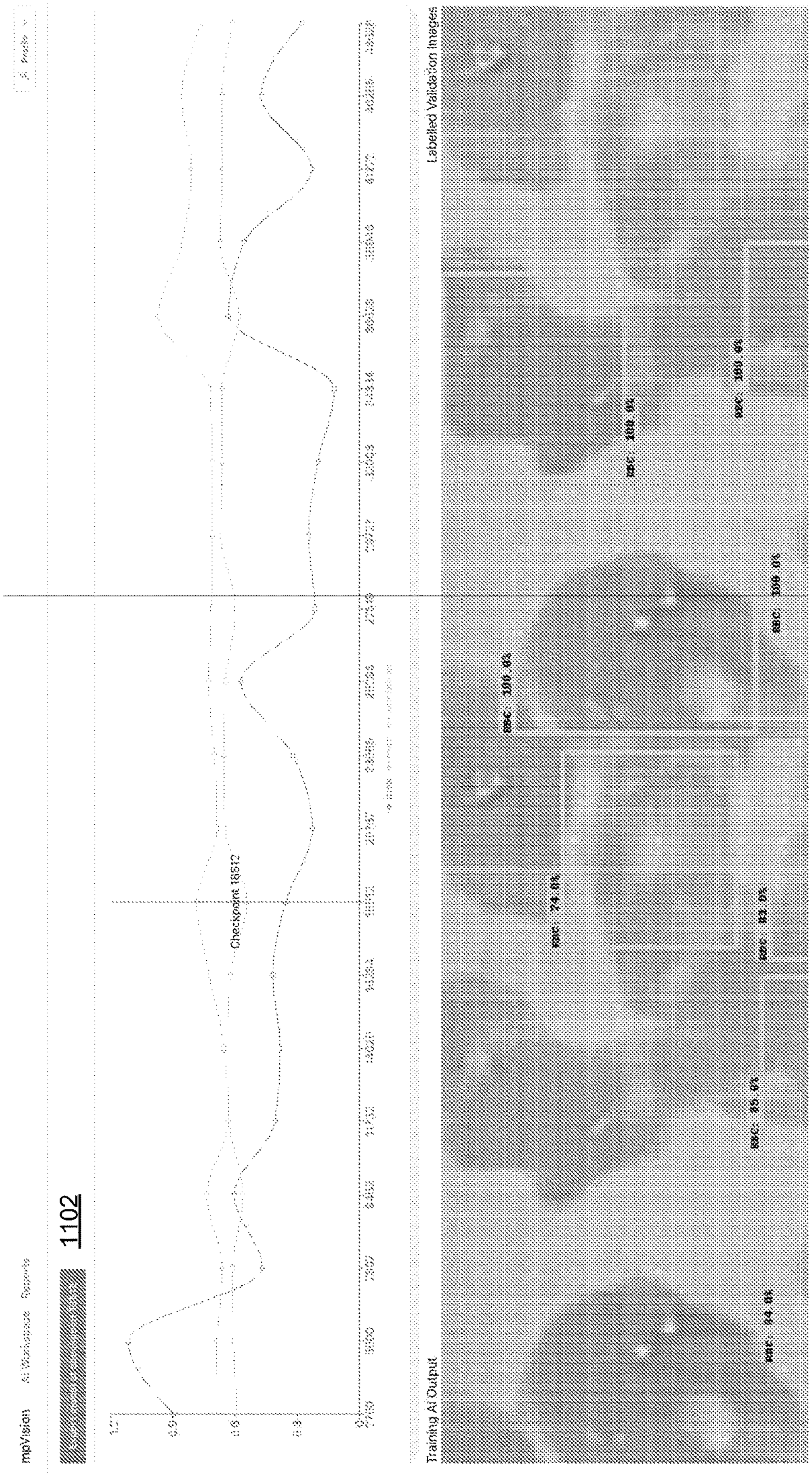
FIG. 11 shows examples of checkpoints and validation images.

Each time the AI model makes predictions on the validation set during the training, the validation images are displayed to visualize the AI performance. FIG. 11 shows an example interface 1100 for displaying the validation images. The frequency of these model predictions may have a default of ten minutes, and the image predictions are captured in the interface 1100. Every group of validation images have an associated model, which is called a Checkpoint. Validation images are generated at time intervals throughout the course of the model training and may be accessed at each checkpoint with a top slider. Each checkpoint number may be selected to view model improvement over the training period. To save a training model, the end user may select 'Export Step' at a specific desired checkpoint 1102, which shows checkpoints and validation images. Checkpoints are automatically generated and may be chosen for export after a desired level of model training. The validation images are each reported in duplicate. The frame on the right is the ground truth image with labeled particles. The image on the left is the frame with model predictions.

iv. Inferencing on New Data 108

Figure 12:
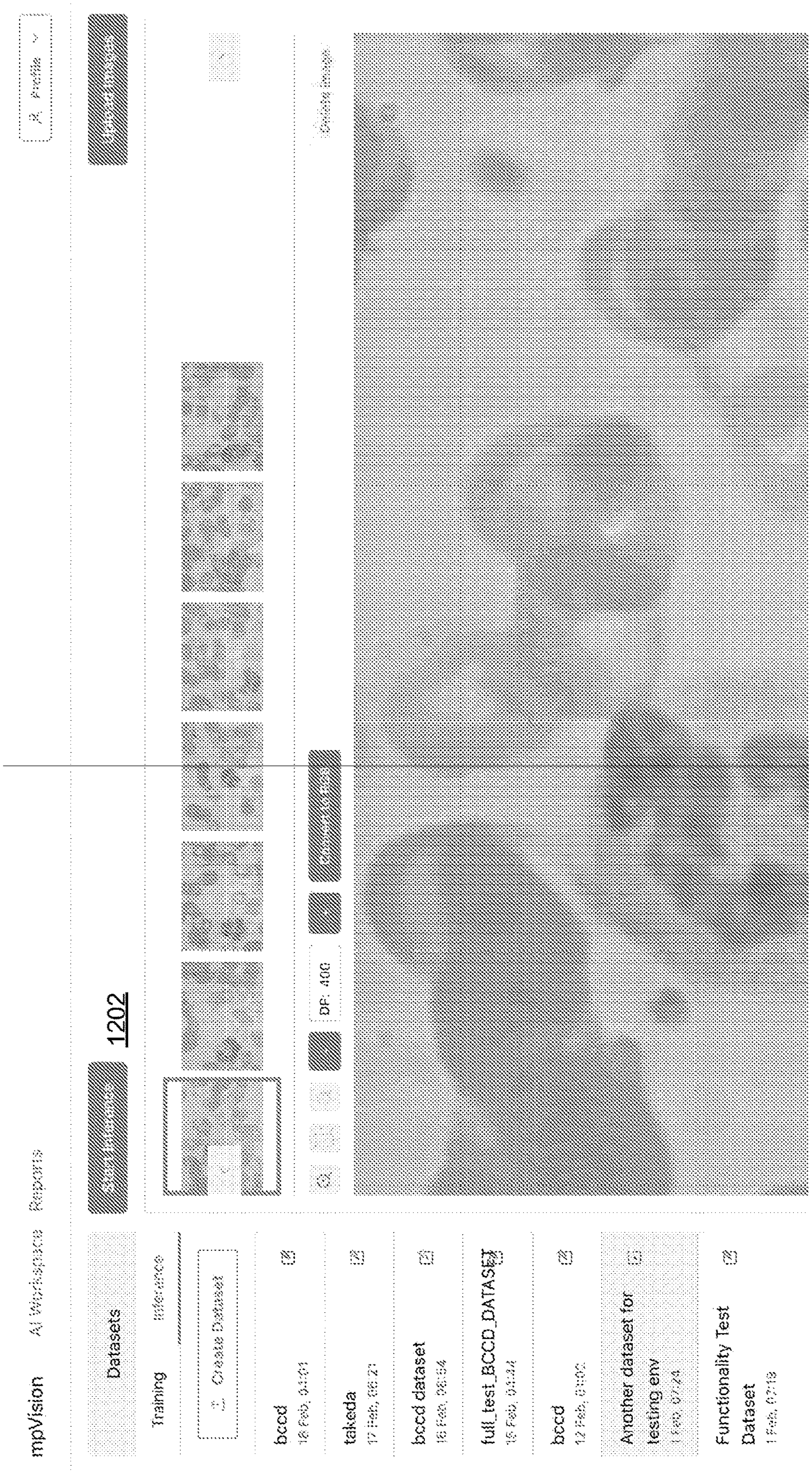
FIG. 12 shows an example of an Inference Page.

After a model has been trained, the model can be used to generate reports on new data. FIG. 12 shows an example interface 1200 of an Inference page. Within the interface 1200, the end user may upload the new frames within the image uploader. The Image Quality Control panel is automatically loaded, which is the same module used previously in the Training page. The new frames uploaded are piped through the Image Quality Control panel.

After the desired particle detection is specified, end user may select the saved training model to apply to the new images by selecting an inference graph from previously trained models. Once the model is selected and the desired pixel:micrometer conversion factor is applied (e.g., default=7 pixels:1 um), Start Inference 1202 may be selected.

Figure 13:
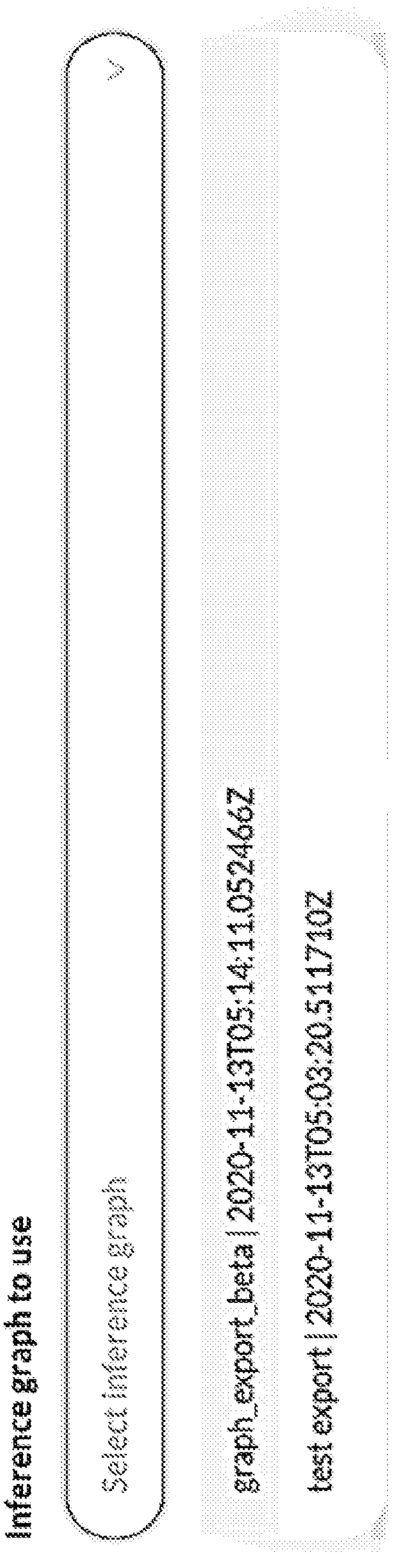
FIG. 13 shows an example selection of the Inference Model.

FIG. 13 shows an example interface 1300 for selection of the Inference Model. The labels of the previously trained model will be used to classify the new images. The results of the inferencing will be tabulated in the Reports page.

v. Report Generation 110

Figure 15:
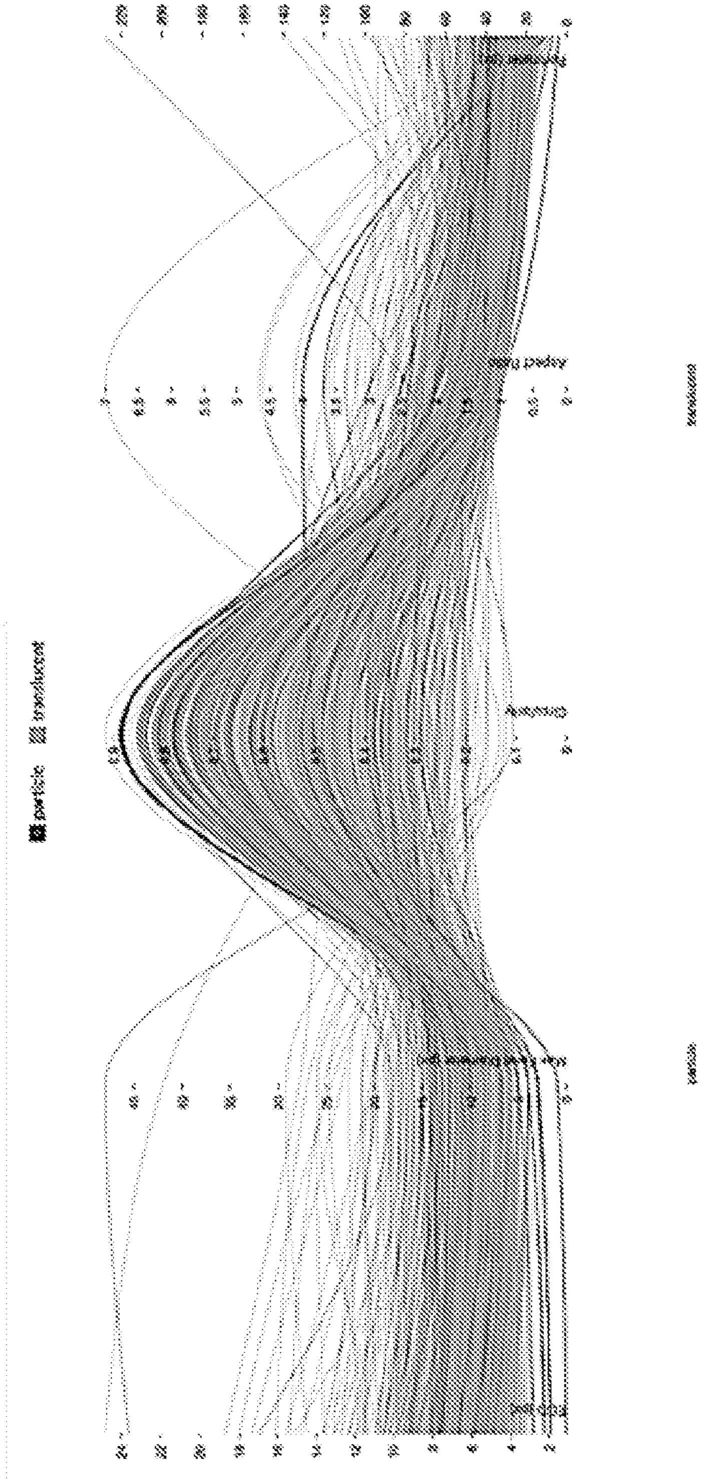
FIG. 15 shows examples of charts of particle composition as well as individual particle images.

FIG. 14 shows an example interface 1400 of a report page. The report page may comprise of a table available for download with particle statistics, image coordinates, and AI outputs. See also Appendix for list of particle statistics outputs. Each particle within its corresponding frame is reported as a single row. To view collective particle statistics for all inferenced frames, 'View Session Report' may be selected in the row with the run's associated date and session ID. To view particle statistics in a specified frame, desired Frame number may be chosen and 'View frame report' selected accordingly. The frame report includes charts of particle composition as well as individual particle images with respective assigned particle classifications. FIG. 15 shows an example interface 1500 showing a frame report chart where the individual frame contents are characterized by the classification).

iii. Software Infrastructure Description

Figure 17:
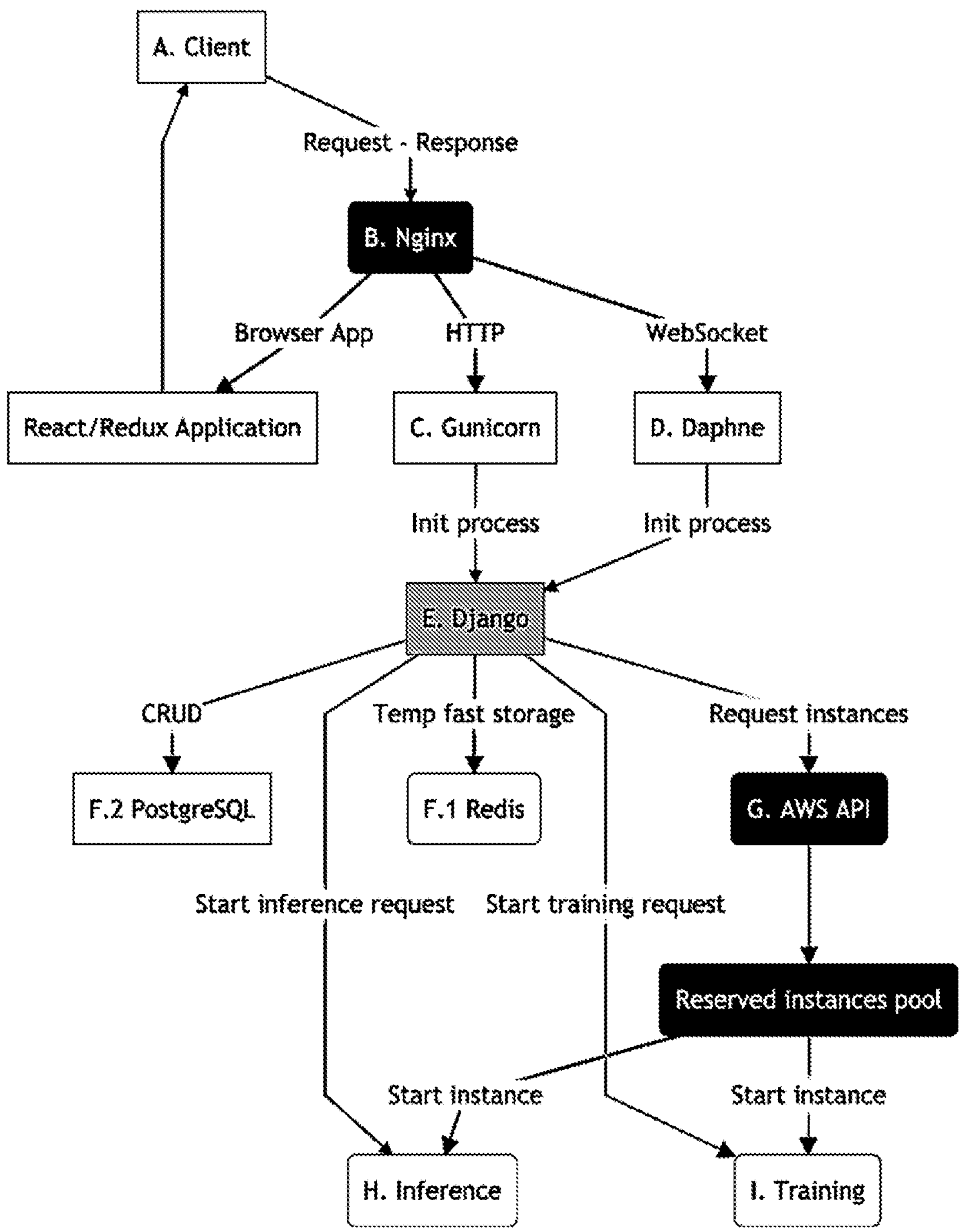
FIG. 17 shows an example of a software architecture.

FIG. 17 shows the computer application's Software Infrastructure Diagram

A. Client

Client (FIG. 17, element A) is the browser which initiates communication with the computer application by sending an HTTP request to a corresponding url. One of more communications described below may happen through Nginx server which is responsible for routing different URI-s to corresponding application scripts and microservices. When uri is an empty string Nginx will return the React SPA (single page application) written in Typescript and transpiled by Webpack to JS/CSS optimized bundle. When user browses different pages the browser history API is used by react-router js package to mimic different routes without actually reloading the browser pages. For fetching data Redux actions are used with Axios sending XHR requests to computer application's backend which may comprise an AWS instance with multiple microservices described below. The SPA uses nested tree of React functional and class components written in JS/JSX to generate actual HTML code and to respond on user events emitted by browser. Application uses global Redux state which is a big key-value storage that changes during the user interactions emitting actions and the UI is rendered based upon it. The actions are handled by small sub-applications that are extending default generic custom storage API functions emitting Redux thunk actions and transmitting the application global state which causes re-rendering of application HTML by React. The application may comprise of six sub-applications:

1. Analytics—collecting information about application usage by users.

2. Auth—responsible for authentication and roles separation.
3. Inference—emits requests and handles reports of inference results.
4. Intro—educates users about how to use the app and its functionality.
5. Profile—holds and updates users accounts information (email, username and etc.)
6. Training—creates actions to start/stop training process and collects data about training sessions and training assets.

Each of the sub-applications defines the particular set of Redux thunk actions and reducers that are handling the state transitions based on the type and the payload of a concrete action.

B. Nginx

Nginx (FIG. 17, element B) is a web server which is used by the computer application as an entry point to the micro-services handling communication between inference, training, websocket, and http servers; and provides basic security level (SSL certificate verification, firewall and etc.). The client requests are handled by Nginx and proxied to the corresponding service.

The HTTP requests from client that have URI that start with /api/ are routed to Gunicorn service and the requests that start with /ws/ are routed to Daphne service where the WebSocket handshake process is initiated that causes the protocol change from HTTP to WebSocket if client supports the latter. The other urls are considered to be paths of the client app itself and the SPA bundle is returned from static folder of the AWS instance.

The communication with Daphne and Gunicorn happens through Unix sockets that are created when the corresponding processes are spawned on the server. Nginx also serves the static files (images, js/css files, icons and etc.) using its internal out-of-the box functionality.

C. Gunicorn

Gunicorn (FIG. 17, element C) is an HTTP server that provides a gateway to Python Web applications and used by the computer application to handle HTTP requests to the REST API endpoints created using Django framework. When the computer application server instance starts it spawns processes (workers) that are listening to the corresponding Unix sockets attached to them to accept requests proxied from client by Nginx. After parsing the request data gunicorn process in turn starts the Django process and passes the request to it and waits for the response which is then returned to Nginx and served to client by it. Gunicorn processes starting and stopping is managed by supervisor provided by Linux OS which is installed on the AWS server instance.

D. Daphne

Daphne (FIG. 17, element D) is an ASGI server which is used by the computer application to handle WebSocket requests from client. Like with Gunicorn its processes are spawned and managed by OS supervisor and are accepting proxied requests from Nginx. After receiving request Daphne server connects it to particular Django view that is maintaining duplex connection logic with client, i.e., providing information about training process and inference results receiving. Daphne also is used for providing communication between regular Django HTTP views and background processes that may require a long time to execute (for example the training start request and images preprocessing).

E. Django

Django (FIG. 17, element E) is a Python Web Framework which handles the business logic of the computer application by providing interface to different services of the application. It connects with PostgreSQL database using Django ORM framework and stores temporary data in the Redis storage. Like the Client, it may comprise smaller Django applications that are responsible for managing requests and manipulating data (storing and updating) that is needed for application. Also initiates the requests to AWS client to start instances on demand, sends data Training and Inference sever providing them frames and corresponding metadata and accepts results from them and stores in the Database.

The Django application is built with 6 sub-applications:

1. Inference—manages the inference process requests and their results storing.
2. Management—handles views to manage users and their related process along with administrating users roles and access to particular parts of the application.
3. RMS—resource management service, responsible for communication with AWS client and is not directly accessible by users.
4. Training—handles the training assets management and storage along with initiation of required training processes requested by users.
5. Users—holds and manages the authentication credentials and roles of users of the app and provides security level based on it.
6. Web—this application is serving general requests that are not bound to particular application rather being a connector between them.

The applications may expose REST endpoints to allow communication with client, which are built on top of Django URL router using Django Rest Framework. The Django application here may be used as a REST service and it is a communication layer between users and their stored data.

F. PostgreSQL and Redis

To store, retrieve and update the data required by users, the computer application uses PostgreSQL (FIG. 17, element F.2) relational database which is hosted by AWS infra. It is accessible by Django and holds data related to particular application of it. All database tables have annotations of the application names of Django that are generated by its ORM (object relational mapping) framework.

Redis (FIG. 17, element F.1) is a memory database. It is used to store temporary data of the application (for example, training loss values while training is in process) which later might be saved in the PostgreSQL storage. Also Redis is used to create communication between application processes providing events on which needed functions could be bound to listen.

G. AWS Infra

To host the computer application, AWS infrastructure (FIG. 17, element G) is used. RMS application of the Django manages access to instances by using AWS Client (Boto3) to manage reserved instances pool on demand. When a user requests inference or training process, the RMS checks the tier of available instances that is assigned to the user in the Management app and requests them from AWS Client.

The algorithm of starting/stopping instances for inference and training can be described as follows:

1. User requests inference/training process to start using Client.
2. RMS Django application's functions are getting called from Inference/Training after checking the assigned user tier.
3. If user tier allows to start the requested process, RMS application checks for already running free instances by comparing the information from AWS client with Database records and if the amount of them is not sufficient—request to AWS backend is sent by Boto3 python client to instantiate more instances.

4. After required instances are started and ready to process the requested process data is sent to them to be processed.
5. After process is done every instance waits for next 10 minutes for further requests.

The communication protocol between Django RMS application and AWS instances is ZeroRPC. Processing results are sent back to Django backend to configured REST API endpoint where they are saved into PostgreSQL database. The instances used are g4dn.xlarge single GPU servers provided by AWS and when not used they are in stopped state. After starting instance waits for 10 minutes for training/inference requests and if that is not happening it is shut down by OS. Instances provisioning is happening with usage of Ansible playbook scripts.

H. Inference

The inference (FIG. 17, element H) is a Python application that is hosted on a GPU instance provided by AWS and is built with Tensorflow and its object detection library. Inference in the context of the computer application refers to the process of applying a fully trained neural network to make particle classifications on new images. An example neural network architecture employed for the particle classification is a Faster Region Based Convolutional Neural Network (Faster R-CNN). The Faster R-CNN architecture may be optimal for object detection, and the algorithm has been manually configured within the computer application to optimally classify specific biologic morphologies with corresponding pixel intensity, size, circularity, area, perimeter, circularity, equivalent circular diameter (ECD), and aspect ratio attributes. These algorithm configurations pertain to the dimension and number of regions of interest proposed by the algorithm, including the scales ([0.1, 0.25, 0.5, 1.0]) and the aspect ratio ([0.5, 1.0, 1.0]). The scaling factor is applied to the width and height of the anchor regions, and the aspect ratio is the anchor region's width/height. In addition, a cyclic learning rate scheduler is implemented to accelerate the learning of the neural network when applied to new particle morphologies, which oscillates within range of cyclic learning rates between 0.003 and 0.00003 for every 1000 steps. This learning rate oscillation enables the end users to achieve a trained and accurate neural network with <1 classification error within 50,000 steps, which is equivalent to six hours of training on a single GPU. These specific algorithm configurations enable the end users to apply their personally self-trained neural networks in real-time to new images, which is termed 'inference'. Image pre-processing is conducted with the OpenCV library. To speed the inference process itself, the computer application uses data splitting—depending on the frames amount multiple instances are spawned and the requested processing frames are split between them and inference happens in parallel on multiple instances.

When the inferencing result is ready the data is sent to Django by an HTTP request to the corresponding API endpoint. Security is provided by AWS infra by Security Groups, meaning that inference instances are only accessible by the instance that hosts Django application and are closed for requests from outside of that network. Since the Django application by nature should allow requests from everywhere JWT authentication is used to receive and validate the data coming from inference instance.

The user is able to choose the default model or provide previously trained model along with canny edges and conversion factor (micrometers to pixels) parameters.

Before actual inferencing starts, pre-processing of provided frames is implemented to both assist image recognition algorithms in identifying particles and to calculate respective particle statistics:

1. Particle edges are drawn on images based on upper and lower thresholds provided by user. The pre-processing algorithm can accurately detect amorphous, multi-colored biologic particles in an image with the following example steps:
   a. Canny edge detection—detects gradients in grayscale image. Parameters are consistent in every image. cv2.Canny(img, 20,49).
   b. Dilation—connects all edges to make enclosed shapes. This enables contouring to calculate area, perimeter, and other properties. Parameters: kernel=(2,2).
   c. Contouring—particles are outlined with contours prior to feeding images to the AI object detection model.
2. Frame is cropped to smaller images (e.g., 45 smaller images), which are referred to as tiles.
3. Every tile is zoomed to make particles area larger to provide the required minimum detection size (approximately 30 pixels in area) for the AI.

After the image recognition algorithm is complete, labels are assigned via a backwards scaling calculation of coordinates that occurs on the tiles in order to match the labels to their coordinates for the original (not tiled) frame.

I. Training

The Training (FIG. 17, element I) application is also hosted on GPU instances provided by AWS infra. It is built with Tensorflow library and provides a service to train neural network. Training in the context of the computer application refers to the process of exposing the neural network to self-labelled images in order for the algorithm to learn the different classifications of particles. The initiation and communication protocols are similar to the ones described in the previous Inference section.

After an instance is started, the Training application waits for training requests from Django RMS application. The request contains frames' paths by which the neural network should learn with corresponding label names. These labelled frames compose a self-generated data set that the end users have curated in order to 'teach' the neural network the different particle classifications. After receiving the assets, the described pre-processing happens before the actual training starts:

1. Frames are split to two different folders in S3 Bucked storage provided by AWS: 20% of provided frames are used for validation and 80% of them are used for actual training.
2. Tensorflow configuration generated based on folder paths and settings provided by user that requests training.
3. Tensorflow training and validation record files are generated.
4. XML files with label coordinates are generated and linked to frames by absolute Unix paths provided in each of them.
5. Empty directories for checkpoints created to store the data during training process.
6. Randomly selected 20% of provided frames are placed into separate directory.

7. Labels pbtxt file is getting generated and stores the labels mapping to unique ids that are used by image recognition algorithm's output.

After all the preprocessing steps are successfully completed, the actual training is started in a separate Unix thread. Provided by configuration options, the training loss values are collected and sent to the Django backend which, in turn reports, these values to user via a WebSocket protocol so the user can monitor the training performance. If user does not manually stop the training process, it will automatically stop after reporting 50,000 steps and will generate corresponding checkpoints.

When training is complete, the user is able to select, export, and save the model to be used with the Inference application. The end user may select the optimally trained model based on its classification performance, which is evaluated with both the reported loss values and the image classification accuracies generated at each checkpoint. This self-training module is provided to the end users to facilitate their model training shown in FIG. 7. The generation happens by Django application which downloads the checkpoint data from S3 bucket, runs the Tensorflow model generation script and stores the frozen graph into S3 storage.

Figure 18:
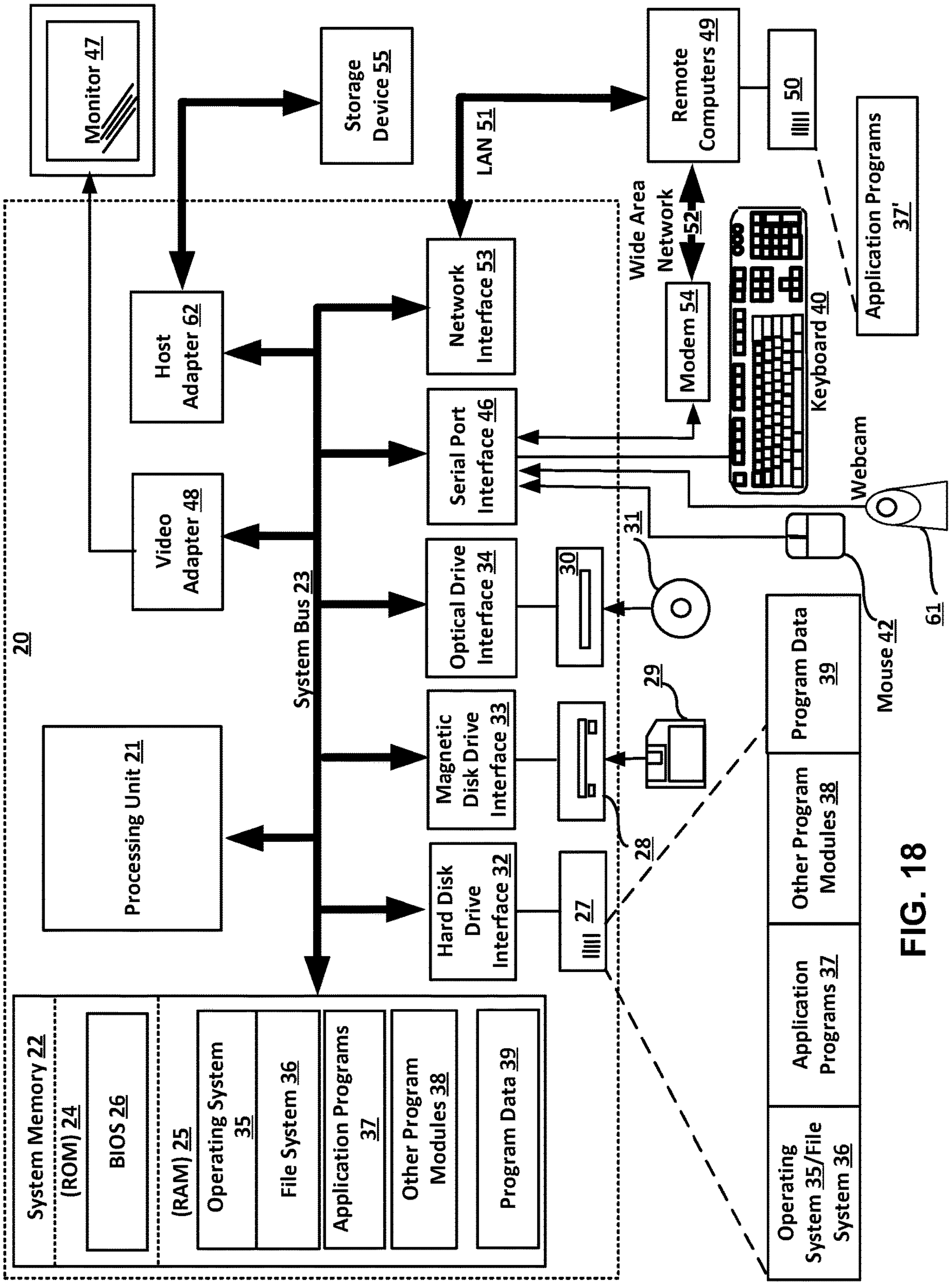
FIG. 18 shows a schematic of an exemplary computer system or server that can be used to implement the embodiments disclosed herein.

With reference to FIG. 18, an exemplary system for implementing the embodiments disclosed herein includes a computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 19:
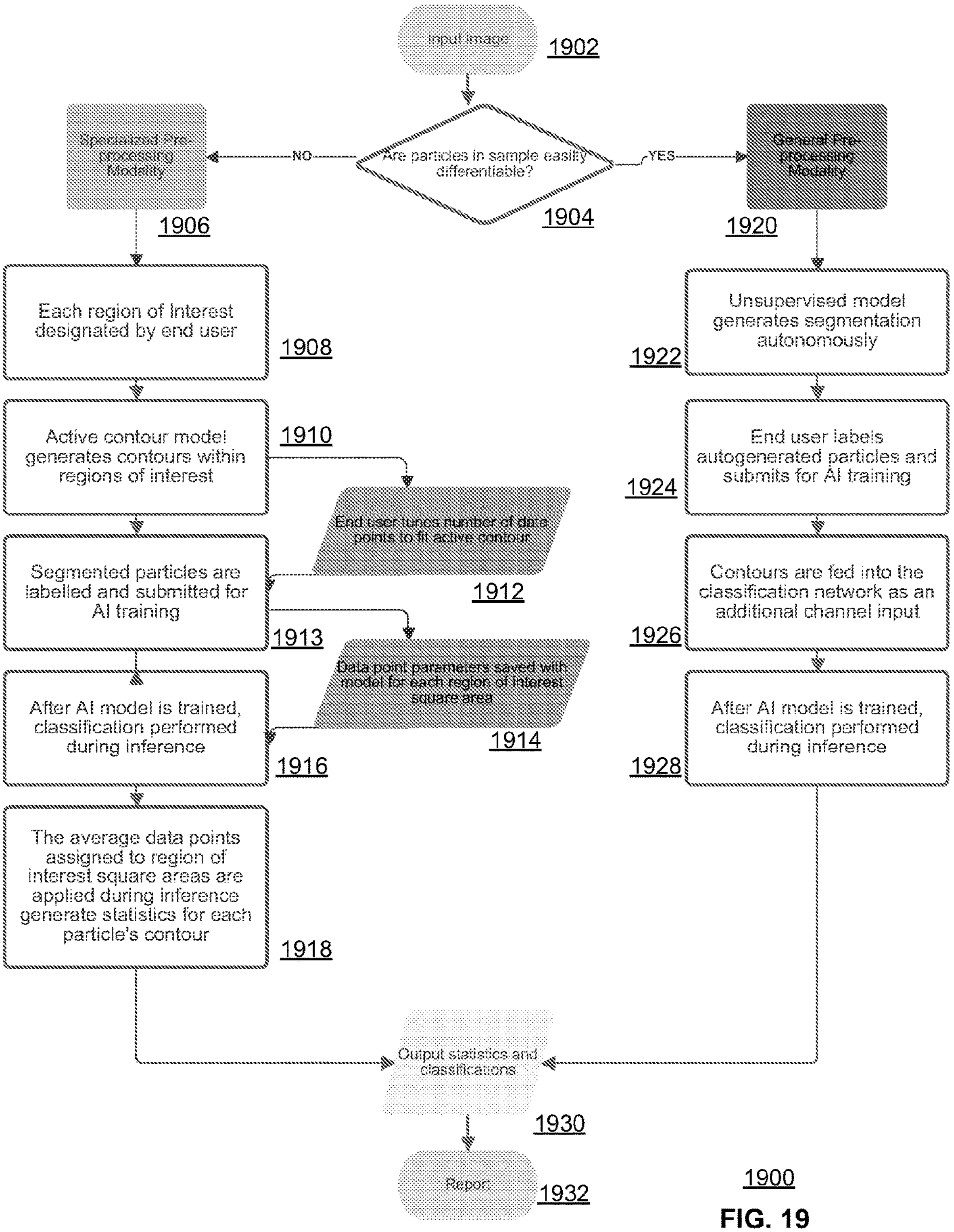
FIG. 19 shows a flow diagram of an illustrative method implementing one or more embodiments disclosed herein.

FIG. 19 shows a flow diagram of an example method 1900, according to the embodiments disclosed herein. The example method 1900 shows two example image pre-processing modalities: a specialized pre-processing modality 1906 and a general pre-processing modality 1920. These dual-modality approach may overcome the challenge of AI generalization associated with object segmentation in diverse biological samples. Biological particles are challenging due to their variation in opacity, morphology, and context within a biological sample. Conventional AI systems cannot generate a desired level of accuracy and precision for biological samples. These shortcomings are apparent in life science imaging fields such as medical imaging.

The dual-modality (or any type of multi-modality) approach has been constructed in the image recognition pipeline shown by the method 1900. Each modality may accommodate the unique nature of biological samples and may offer the end-users flexibility for achieving an AI generalization across images. Each pre-processing modality implementation may depend on the end user's sample requirements: the general modality may provide functionality to identify common, routine, or readily differentiable parties; and the specialized modality may provide the end user a flexibility to tailor image recognition for distinctive and unusual samples that may prove difficult to differentiate.

The method 1900 may begin at step 1902, where an input image is received. At step 1904, a determination may be made as to whether the particles in the sample of the image are easily or readily differentiable. If the determination is that they are not easily differentiable, the specialized pre-processing modality 1906 may be invoked. If the determination is that they are easily differentiable, the general pre-processing modality 1920 may be invoked.

In the specialized pre-processing modality 1906, regions of interest may be designated by end user at step 1908. At step 1910, an active contour model may generate contours within the regions of interested designated by the end user. At step 1912, the end user may tune the number of data points to fit the active contour generated at step 1910. At step 1913, the segmented particles are labelled and submitted for AI training. At step 1914, date point parameters are saved with model of each region for each region of interest. In this manner, every particle of interest, regardless of its morphology and context within an image, can be segmented by the end user before the classification algorithm is trained to identify the particle. Details of the AI training are described below.

After the AI model is trained, a classification may be performed at an inference step 1916. The inference may include applying, at step 1918, average data points assigned to the regions of interest to the new images to generate statistics for each particle's contour. These output statistics and classifications may be output in step 1930.

In the general pre-processing modality 1920, a unsupervised AI pre-processing algorithm may autonomously generate segmentation in an image at step 1922. The unsupervised AI algorithm may have been trained on a large number of cell samples and may not necessarily need domain experts to identify regions of interest. At step 1924, the end user labels the autogenerated particles and submits the labeled autogenerated particles for AI training. At step 1926, the contours are fed into the classification network (or AI network) as an additional channel input. After the AI model is trained, the classification is performed during inference in step 1928. The classification data is output in step 1930. Based on the statistics and classifications, a report may be output in step 1932.

The training of the model after the pre-processing may include submitting labelled dataset to an AI training module. In some embodiments, the training may include implementing a training workflow on a GPU for a predetermined time (e.g., six hours). The GPU may use cyclical learning rates to train the classification algorithm while preventing the AI from fitting to a local minimum instead of a global minimum. The cyclic learning rate may cycle between 0.003 and 0.0003 every 1000 steps of training in the following example pattern:

```
learning_rate: {
  manual_step_learning_rate {
    initial_learning_rate: 0.003
    {% for rate in learning_rates %}
    schedule {
      step: {{loop.index * 1000}}
      learning_rate: {{rate}}
    }
    {% endfor %}
```

The trained AI model with an optimal performance may be saved. In the case of the specialized pre-processing modality, the trained model may be saved along with the average associated data point parameters per region of interest assigned by the end user during image labeling. This approach may enable the statistics generated from the contours to match the region of interest size and data point parameter that the end user assigned initially during the image labeling.

For example, average data point parameters may be calculated for the following region of interest areas (in square pixels):

0 to 400
401 to 250000
250001 to 1000000
1000001 to maximum area

These parameters along with the saved AI model may be applied to new images during the inference steps. The particle contours are then automatically applied during the inference steps to generate the statistics and classification outputs.

Having thus described the example embodiments, it should be apparent to those skilled in the art that certain advantages of the described method and system have been achieved.

It should also be appreciated that various modifications, adaptations, and alternative embodiments thereof may be made within the scope and spirit of the present disclosure.

APPENDIX

Biologic Particle Statistics Formulae

| Statistic and Unit | Formula |
|---|---|
| ECD (equivalent circular diameter) [px] | 2*sqrt(Area/pi) |
| Area [px] | Number of particle pixels |
| Perimeter [px] | Number of particle outline pixels |
| Circularity | 4 * PI * (Area)/(Perimeter)^2 |
| Max Feret Diameter [px] | The longest distance between any two points along the particle |
| Aspect Ratio | Minor Axis/Major Axis |
| X, Y Coordinates [px] | Particle bounding rectangle |

What is claimed is:

1. A method for analyzing anomalies in pharmaceuticals, the method comprising:
- pre-processing one or more images that include pharmaceutical samples;
- receiving, from an end user, designations of regions of interest in the one or more images;
- automatically generating, by an active contour model, contours within the regions of interest designated by the user;
- receiving, from the end user, labels identifying the contoured regions of interest;
- training a machine learning model using the contoured regions of interest automatically generated by the active contour model and the corresponding labels identified by the user; and
- deploying the trained machine learning model to identify an anomaly in a new pharmaceutical sample image.

2. The method of claim 1, further comprising:
- receiving, from the end user, one or more fine tuning parameters for fitting the generated contours and the corresponding regions of interest.

3. The method of claim 1, further comprising:
- saving the trained machine learning model with average data point parameters associated with the end user designated regions of interest.

4. The method of claim 3, wherein the deployment of the trained machine learning model comprises applying the average data point parameters to the new pharmaceutical sample image.

5. The method of claim 3, wherein the average data point parameters are based on corresponding areas of the end user designated regions of interest.

6. The method of claim 1, further comprising:
outputting the identified anomaly in the new pharmaceutical image.

7. The method of claim 1, further comprising:
providing a first interface for the end user to upload the one or more images that include pharmaceutical samples.

8. The method of claim 7, further comprising:
providing a second interface for the end user to designate the regions of interest in the one or more images.

9. The method of claim 8, further comprising:
providing a third interface for the end user to enter the labels identifying the contoured regions of interest.

10. A method for analyzing anomalies in pharmaceuticals, the method comprising:
pre-processing, by an artificial intelligence model, one or more images that include pharmaceutical samples, autonomously generating regions of interest;
receiving, from an end user, labels identifying the autonomously generated regions of interest;
training a machine learning model using the autonomously generated regions of interest by the artificial intelligence model and the corresponding labels identified by the user; and
deploying the trained machine learning model to identify an anomaly in a new pharmaceutical sample image.

11. The method of claim 10, wherein the autonomous generation of the regions of interest comprises:
using an unsupervised model on the one or more images to autonomously generate the regions of interest.

12. The method of claim 10, wherein training the machine learning model comprises:
training the machine learning model using contours associated with the regions of interest, wherein the contours are provided as additional channel input.

13. The method of claim 10, further comprising:
outputting the identified anomaly in the new pharmaceutical image.

14. The method of claim 10, further comprising:
providing a first interface for the end user to upload the one or more images that include pharmaceutical samples.

15. The method of claim 10, further comprising:
providing a second interface for the end user to enter the labels identifying the autonomously generated regions of interest.

16. A system for analyzing anomalies in pharmaceuticals, the system comprising:
a non-transitory computer readable medium storing computer program instructions;
at least one processor configured to execute the computer program instructions that when executed by the at least one processor cause the system to perform operations comprising:
autonomously generating, by an artificial intelligence model, regions of interest in one or more images that include pharmaceutical samples;
receiving, from an end user, labels identifying the generated regions of interest;
training a machine learning model using the autonomously generated regions of interest by the artificial intelligence model and the corresponding labels identified by the user; and
deploying the trained machine learning model to identify an anomaly in a new pharmaceutical sample image.

17. The system of claim 16, wherein generating regions of interest in the one or more images that include pharmaceutical samples comprises:
using an unsupervised model on the one or more images to autonomously generate the regions of interest.

18. The system of claim 16, wherein generating regions of interest in the one or more images that include pharmaceutical samples comprises:
receiving, from an end user, designations of regions of interest in the one or more images.

19. The system of claim 16, wherein the operations further comprise:
outputting the identified anomaly in the new pharmaceutical image.

20. The system of claim 16, wherein the operations further comprise:
providing an interface for the end user to upload the one or more images that include pharmaceutical samples.

* * * * *